US009258705B2

(12) United States Patent
Kang et al.

(10) Patent No.: US 9,258,705 B2
(45) Date of Patent: Feb. 9, 2016

(54) APPARATUS, METHOD AND SYSTEM FOR CREATING AND MAINTAINING MULTICAST DATA ENCRYPTION KEY IN MACHINE TO MACHINE COMMUNICATION SYSTEM

(75) Inventors: Hyun-Jeong Kang, Seoul (KR); Young-Kyo Baek, Seoul (KR); Rakesh Taori, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 29 days.

(21) Appl. No.: 13/539,015

(22) Filed: Jun. 29, 2012

(65) Prior Publication Data
US 2013/0003972 A1 Jan. 3, 2013

(30) Foreign Application Priority Data
Jul. 1, 2011 (KR) ........................ 10-2011-0065387

(51) Int. Cl.
| | |
|---|---|
| *H04W 12/06* | (2009.01) |
| *H04W 12/04* | (2009.01) |
| *H04W 4/00* | (2009.01) |
| *H04W 60/04* | (2009.01) |
| *H04L 12/18* | (2006.01) |
| *H04W 4/08* | (2009.01) |
| *H04L 9/08* | (2006.01) |
| *H04L 29/06* | (2006.01) |

(Continued)

(52) U.S. Cl.
CPC ............ *H04W 12/06* (2013.01); *H04L 9/0833* (2013.01); *H04L 9/0869* (2013.01); *H04L 12/1895* (2013.01); *H04L 63/065* (2013.01); *H04W 4/005* (2013.01); *H04W 4/08* (2013.01); *H04W 12/02* (2013.01); *H04W 12/04* (2013.01); *H04W 12/08* (2013.01); *H04W 60/04* (2013.01); *H04W 4/06* (2013.01)

(58) Field of Classification Search
CPC ..... H04W 8/26; H04W 12/06; H04W 84/047; H04W 12/04; H04W 4/005; H04W 4/06; H04W 60/04; H04W 12/02; H04W 12/08; H04W 4/08; H04L 9/0833; H04L 9/0869; H04L 63/065; H04L 12/1895
USPC ............................................... 380/270; 726/4
See application file for complete search history.

(56) References Cited

U.S. PATENT DOCUMENTS

| | | | |
|---|---|---|---|
| 8,160,254 | B2 | 4/2012 | Cho et al. |
| 8,495,363 | B2 | 7/2013 | Anchan et al. |

(Continued)

FOREIGN PATENT DOCUMENTS

WO  WO 2006/089101 A2  8/2006

OTHER PUBLICATIONS

International Search Report dated Jan. 25, 2013 in connection with International Application No. PCT/KR2012/005163.

(Continued)

*Primary Examiner* — Ali Abyaneh
*Assistant Examiner* — Ayoub Alata

(57) ABSTRACT

A wireless communication system includes a system and method for encryption of multicast data between a subscriber station and a base station that communicate a multicast service in a Machine-To-Machine (M2M) communication system. An M2M service controller manages the multicast service manages information for encrypting the multicast data and provides the information to the subscriber station and the base station.

40 Claims, 18 Drawing Sheets

(51) Int. Cl.
*H04W 12/02* (2009.01)
*H04W 12/08* (2009.01)
*H04W 4/06* (2009.01)

(56) References Cited

U.S. PATENT DOCUMENTS

| | | |
|---|---|---|
| 2001/0023487 A1 | 9/2001 | Kawamoto |
| 2007/0154016 A1* | 7/2007 | Nakhjiri et al. ............... 380/270 |
| 2007/0280235 A1 | 12/2007 | Chen et al. |
| 2009/0164788 A1* | 6/2009 | Cho et al. ...................... 713/175 |
| 2009/0191857 A1* | 7/2009 | Horn et al. .................... 455/419 |
| 2009/0196424 A1* | 8/2009 | Germaneau et al. .......... 380/277 |
| 2009/0219850 A1 | 9/2009 | Lin et al. |
| 2009/0227234 A1* | 9/2009 | Bosch et al. .................. 455/411 |
| 2009/0235075 A1 | 9/2009 | Cho et al. |
| 2010/0098247 A1* | 4/2010 | Suumaki ......................... 380/44 |
| 2010/0165911 A1* | 7/2010 | Chiu et al. ..................... 370/315 |
| 2010/0257365 A1 | 10/2010 | Anchan et al. |
| 2013/0315389 A1* | 11/2013 | Jung et al. ....................... 380/31 |

OTHER PUBLICATIONS

Written Opinion of International Searching Authority dated Jan. 25, 2013 in connection with International Application No. PCT/KR2012/005163.

Extended European Search Report dated Feb. 27, 2015 in connection with European Patent Application No. 12807602.3; 8 pages.

Menezes, et al.; "Handbook of Applied Cryptography"; CRC Press LLC; Jan. 1, 1997; 21 pages.

\* cited by examiner

APPARATUS, METHOD AND SYSTEM FOR CREATING AND MAINTAINING MULTICAST DATA ENCRYPTION KEY IN MACHINE TO MACHINE COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jul. 1, 2011 and assigned Serial No. 10-2011-0065387, the contents of which are herein incorporated by reference.

TECHNICAL FIELD OF THE INVENTION

The present disclosure relates to an apparatus, method and system for creating a multicast data encryption key in a Machine-To-Machine (M2M) communication system. Also, the present disclosure relates to an apparatus, method and system for maintaining a multicast data encryption key in a Machine-To-Machine (M2M) communication system.

BACKGROUND OF THE INVENTION

Research is being conducted on an M2M communication service supporting data communication between devices when no human interaction exists or when human control is very restrictive. The M2M communication service is attracting attention in decreasing a cost of managing devices through automatic control and communication. More particularly, the M2M communication service is a technology applicable to fleet management for vehicles and articles mounted on the vehicles, smart metering, home automation, health care and the like, and the possibility of its utilization is being expected.

In an M2M communication system, a system designer should consider a case where only a restricted device receives specific data, unlike a terminal of a general communication system. For example, information provided by a specific utility company has to be received by only a device that joins a service of the specific utility company and performs smart metering. For another example, a health care device receives health care information from a health care server, thereby being capable of maintaining, the latest health care information. At this time, the health care information should be transmitted only to a device joining a corresponding service.

As described above, there occurs a situation of transmitting or receiving limited data according to terminal's purpose and use in an M2M communication system. At this time, when a plurality of terminals of the same kind exists, the terminals all receive the same data from an M2M server. In this case, multicast data transmission is expected to provide efficiency in which the plurality of terminals transmits the same data. Therefore, a way for securely transmitting corresponding data only to a limited plurality of terminals is needed.

Thus, a way of creating and maintaining a multicast data encryption key in an M2M communication system is needed.

SUMMARY OF THE INVENTION

To address the above-discussed deficiencies of the prior art, it is a primary object to provide at least the advantages below. Accordingly, one aspect of the present disclosure is to provide a method and apparatus for creating and maintaining a multicast data encryption key in a Machine-To-Machine (M2M) communication system.

Another aspect of the present disclosure is to provide a method and system for creating and maintaining a multicast data encryption key in an M2M communication system.

A further aspect of the present disclosure is to provide a method and apparatus for a multicast data service in an M2M communication system.

The above aspects are achieved by providing a method, apparatus and system for creating and maintaining a multicast data encryption key in an M2M communication system.

According to one aspect of the present disclosure, a subscriber station operation method for multicast data service in an M2M communication system is provided. The method includes performing a network entry procedure through a Base Station (BS), at network entry procedure execution, receiving multicast service authentication information from the BS, creating a multicast data encryption key using the multicast service authentication information, and transmitting/receiving data with the BS using the multicast data encryption key.

According to another aspect of the present disclosure, a BS operation method for multicast data service in an M2M communication system is provided. The method includes supporting a network entry procedure of a subscriber station, at network entry procedure execution, receiving multicast service authentication information from a system controller, and forwarding the multicast service authentication information to the subscriber station, creating a multicast data encryption key using the multicast service authentication information, and transmitting/receiving data with the subscriber station using the multicast data encryption key.

According to a further aspect of the present disclosure, a system controller operation method for multicast data service in an M2M communication system is provided. The method includes supporting an authentication procedure between a subscriber station and an AAA, exchanging authentication information of the subscriber station with the AAA, at exchange of the authentication information of the subscriber station, deter mining whether multicast service authentication information has been comprised from the AAA, and forwarding the multicast service authentication information received from the AAA, to a BS.

According to a yet another aspect of the present disclosure, a system controller operation method for multicast data service in an M2M communication system is provided. The method includes supporting an authentication procedure between a subscriber station and an AAA, exchanging authentication information of the subscriber station with the AAA, sending a request for M2M service authentication to a group service controller, and receiving multicast service authentication information from the group service controller, and forwarding the multicast service authentication information received from the group service controller, to a BS.

According to a still another aspect of the present disclosure, a group service controller operation method for multicast data service in an M2M communication system is provided. The method includes deciding multicast service authentication information, when receiving an M2M service authentication request from an AAA or a system controller, transmitting the decided multicast service authentication information to the AAA or the system controller, determining whether a change of the multicast service authentication information is needed, and, when the change of the multicast service authentication information is needed, deciding new multicast service authentication information and transmitting the new multicast service authentication information to the AAA or the system controller.

According to a still another aspect of the present disclosure, a system for supporting a multicast data service in an M2M communication system is provided. The system includes a subscriber station and a BS. During a network entry procedure execution, the subscriber station receives multicast service authentication information from the BS, and creates a multicast data encryption key using the multicast service authentication information. During the network entry procedure execution, the BS receives the multicast service authentication information from a system controller, forwards the multicast service authentication information to the subscriber station, and creates a multicast data encryption key using the multicast service authentication information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:disclosure

DETAILED DESCRIPTION OF THE INVENTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Preferred embodiments of the present disclosure will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification.

Below, the present disclosure describes a technology for creating and maintaining a key encrypting multicast data when transmitting the multicast data to a plurality of Machine-To-Machine Subscriber Stations (M2M SSs) in an M2M communication system.

The present disclosure relates to an M2M communication system. Particularly, the present disclosure relates to an apparatus and method for supporting the encryption of multicast service data in an M2M wireless communication system.

Figure 1:
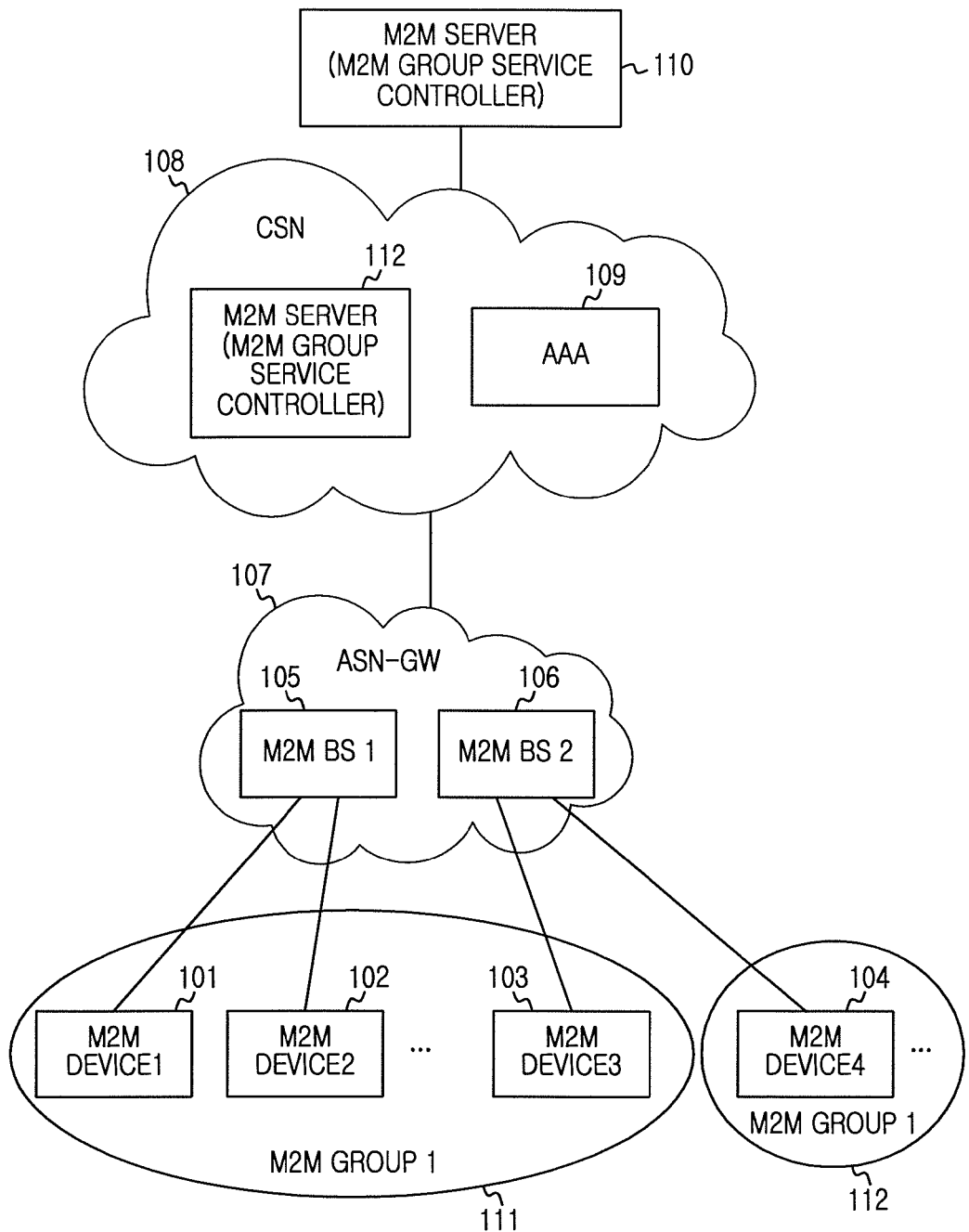
FIG. 1 illustrates a schematic construction of a Machine-To-Machine (M2M) communication system according to an exemplary embodiment of the present disclosure.

FIG. 1 illustrates a schematic construction of an M2M communication system according to an exemplary embodiment of the present disclosure.

Referring to FIG. 1, the M2M communication system includes M2M SSs 101, 102, 103, and 104 supporting device communication, M2M Base Stations (BSs) 105 and 106 supporting the device communication, an Access Service Network Gateway (ASN-GW) 107 (hereinafter, referred to a system controller), a Connected Service Network (CSN) 108, an Authentication, Authorization, and Accounting (AAA) 109, and an M2M server/M2M group service controller 110.

The M2M SSs 101 to 104, which are devices performing communication without user's intervention, are terminals mounting application programs necessary for device communication. The M2M SSs 101 to 104 have joined a multicast service managed by the M2M server 110. The M2M SSs 101 to 103 have joined a multicast group1 111, and the M2M SS 104 has joined a multicast group2 112. The M2M BSs 105 and 106 and the ASN-GW 107 provide a wireless Access Point (AP) necessary for communication between the M2M SSs 101 to 104 and the M2M server 110. Particularly, the M2M BSs 105 and 106 control wireless resources necessary for communication between the M2M SSs 101 to 104 and the M2M server 110. The ASN-GW 107 performs even the function of a paging controller managing idle mode operations of the M2M SSs 101 to 104. The CSN 108 provides a user-side connection service to the M2M SSs 101 to 104. The AAA 109 located in the CSN 108 provides an access network authorization service for the M2M SSs 101 to 104. The M2M server 110 performs communication with the one or plurality of M2M SSs 101 to 104, mounts an application program necessary for device communication, and has an interface that a user can access. In FIG. 1, according to system management, the M2M server 110 can be an object separate from the CSN 108 or be included in the CSN 108. Also, according to an exemplary embodiment of the present disclosure, the M2M server/M2M group service controller 110 creates and maintains an authentication and encryption key for multicast service data of the M2M SSs 101 to 103, which have joined a service of the multicast group1 111, and the M2M SS 104, which has joined a service of the multicast group2 112. That is, the M2M server/M2M group service controller 110 performs an operation of creating and updating an M2M service Authorization Key (MAK) and an M2M service Group Security Seed (MGSS) that are required to encrypt multicast data transmitted to an M2M SS belonging to the multicast group1 111 or the multicast group2 112.

In the M2M communication system, a wireless interface between the M2M SSs 101 to 104 and the M2M BSs 105 and 106 can follow an existing communication standard or follow a communications standard designed for the M2M communication system. For example, the Institute of Electrical and Electronics Engineers (IEEE) 802.16 communication system standard can be applied. In this case, the M2M SSs 101 to 104 can operate like mobile stations defined in the IEEE 802.16 communication system. Below, the present disclosure describes an Orthogonal Frequency Division Multiplexing/ Orthogonal Frequency Division Multiple Access (OFDM/ OFDMA) wireless interface, by way of example.

Figure 2:
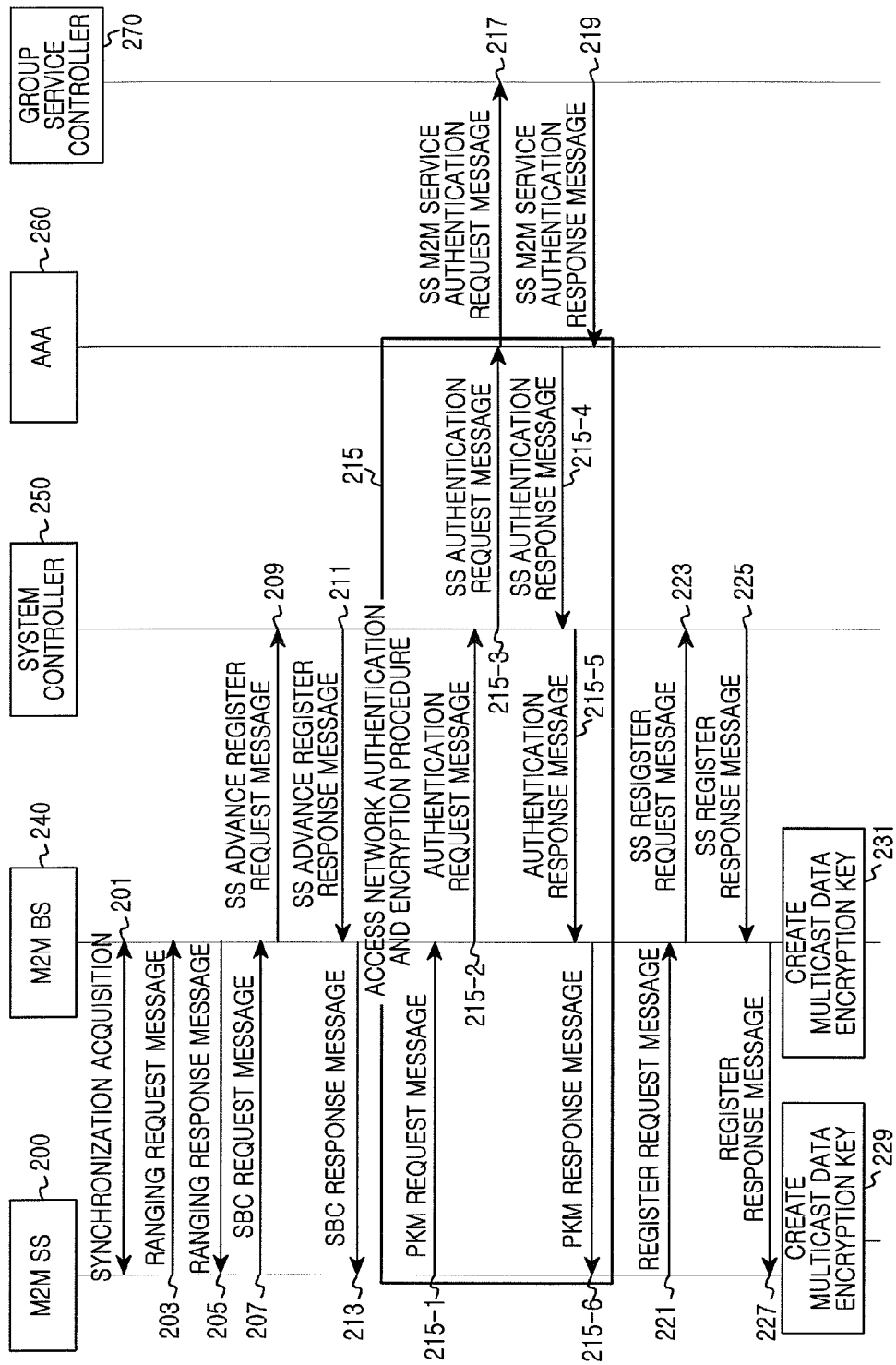
FIG. 2 illustrates a signal exchange of an M2M Subscriber Station (SS), M2M Base Station (BS), system controller, Authentication, Authorization, and Accounting (AAA), and group service controller, for transmitting/receiving an M2M service group security seed in an M2M communication system according to a first exemplary embodiment of the present disclosure.

FIG. 2 illustrates a signal exchange of an M2M SS, M2M BS, system controller, AAA, and group service controller, for transmitting/receiving an M2M service group security seed in an M2M communication system according to a first exemplary embodiment of the present disclosure.

Referring to FIG. 2, in step 201, the M2M SS 200 and the M2M BS 240 perform downlink channel acquisition and Media Access Control (MAC) synchronization and acquire an uplink channel parameter according to a synchronization procedure. Thereafter, in step 203, the M2M SS 200 sends a ranging request message (RNG-REQ) to the M2M BS 240 and, in step 205, in response to the ranging request message (RNG-REQ), the M2M BS 240 sends a ranging response message (RNG-RSP) to the M2M SS 200, thereby performing a ranging procedure.

Then, in step 207, the M2M SS 200 sends a Subscriber Station's Basic Capability negotiation request message (SBC-REQ) to provide a basic provision capability to the M2M BS 240. Then, in step 209, the M2M BS 240 sends an advance register request message for the M2M SS 200 to the system controller 250 so as to inform that a new M2M SS enters a network. Then, in step 211, the system controller 250 sends an advance register response message for the M2M SS 200 to the M2M BS 240. Also, the system controller 250 provides information of the M2M SS 200 to the AAA 260 (not shown) so as to process access network authorization for the M2M SS 200. Then, in step 213, the M2M BS 240 sends a subscriber station's basic capability negotiation response message (SBC-RSP) as a response of step 207 to the M2M SS 200.

Next, in step 215, the M2M SS 200, the M2M BS 240, the system controller 250, and the AAA 260 perform an access network authentication and encryption procedure for the M2M SS 200. Here, an Extensible Authentication Protocol (EAP) authentication method can be used such as EAP-Protected EAK (EAP-PEAP), EAP-Tunneled TLS Authentication Protocol (EAP-TTLS), EAP-Transport Layer Security (EAP-TLS), EAP-Subscriber Identity Module (EAP-SIM), and EAP-Authentication and Key Agreement (EAP-AKA).

The access network authentication and encryption procedure of step 215 is described below as one example. In step 215-1 and step 215-6, the M2M SS 200 sends an authentication/encryption (i.e., Privacy Key Management (PKM)) request message to the M2M BS 240 and receives an authentication/encryption (i.e., PKM) response message from the M2M BS 240. In step 215-1 and step 215-6, message exchange occurs twice or more between the M2M SS 200 and the M2M BS 240. In step 215-2 and step 215-5, the M2M BS 240 transmits/receives an authentication request message/ authentication response message including authentication and encryption information about the M2M SS 200, with the system controller 250. In step 215-2 and step 215-5, message exchange occurs twice or more between the M2M BS 240 and the system controller 250. Also, in step 215-3 and step 215-4, the system controller 250 transmits/receives a subscriber station authentication request message/subscriber station authentication response message with the AAA 260 that manages access network authentication and encryption for the M2M SS 200. Even in this case, message exchange occurs twice or more between the system controller 250 and the AAA 260.

In step 217, the AAA 260 sends an M2M service authentication request message for the M2M SS 200 to the group service controller 270 (i.e., the M2M server) that controls a device communication service of the M2M SS 200. The group service controller 270 performs M2M service authentication for the M2M SS 200 and, when the M2M SS 200 has joined a multicast service, in step 219, the group service controller 270 sends the AAA 260 an M2M service authentication response message, which includes multicast service information of the M2M SS 200 and an M2M service authorization key and M2M service group security seed necessary for multicast service data encryption. The multicast service information includes an identifier of a multicast group that the M2M SS 200 has joined, and the like.

For example, the multicast service information and the multicast service authentication information can be configured as in Table 1 below.

TABLE 1

| Name | Description/Notes |
|---|---|
| Multicast group ID | Identifier of M2M multicast group |
| M2M service authorization key | M2M service authorization key that is provided to all authorized M2M devices |
| M2M service group security seed | M2M service group security seed that is common for all M2M devices in the same multicast group |

In Table 1, the multicast group ID and the M2M service group security seed are parameters decided in the group service controller 270. The M2M service authorization key is a key (e.g., a Master Session Key (MSK)) that is shared by the M2M SS 200, the M2M BS 240, the system controller 250, and the AAA 260 in the access network authentication and encryption procedure of step 215 or an Authorization Key (AK). According to realization, M2M service authorization key information can be omitted among the multicast service information.

The multicast service information and the multicast service authentication information are used for authenticating an M2M SS having joined a multicast service for device communication and authenticating a service of the M2M SS. The M2M service Authorization Key (MAK) can be directly forwarded off-line to the M2M BS and the M2M SS or can be created or forwarded through a secure key sharing method of an upper layer, without being forwarded as in Table 1 above.

Upon receiving the M2M service authentication response message of step 219, the AAA 260 transmits the multicast service authentication information of Table 1 to the system controller 250 using the M2M authentication response message of step 215-4.

Alternatively, in step 221, the M2M SS 200 sends a register request message (REG-REQ) to the M2M BS 240. Then, in step 223, the M2M BS 240 sends a subscriber station register request message for the M2M SS 200, to the system controller 250. Then, in step 225, the system controller 250 transmits the multicast service authentication information including the M2M service group security seed received from the AAA 260, to the M2M BS 240 using a subscriber station register response message. Then, in step 227, the M2M BS 240 transmits the multicast service authentication information including the M2M service group security seed to the M2M SS 200 using a register response message (REG-RSP). Next, in steps 229 and 231, the M2M SS 200 and the M2M BS 240 create multicast data encryption keys using the multicast service authentication information including the M2M service group security seed, respectively. Here, the multicast data encryption keys are created by Equation 1 below.

$$MGTEK = Dot16KDF(MAK, MGSS|MGID|\text{``MGTEK''}, 128) \quad [\text{Eqn. 1}]$$

In Equation 1, the MGTEK is a multicast data encryption key, the MAK is an M2M service authorization key, the MGSS is an M2M service group security seed, the MGID is a multicast group identifier, "MGTEK" is a character string representing that it is a multicast data encryption key, and the Dot16KDF is an algorithm of creating a multi cast data encryption key of 128 bits that inputs an M2M service authorization key, an M2M service group security seed, and a multicast group identifier.

As another example, a procedure for acquiring information about a multicast service that the M2M SS 200 has joined and authentication information about the multicast service as in step 217 to step 219 of FIG. 2 can use message transaction in which the system controller 250 requests and the group service controller 270 responds.

Figure 3:
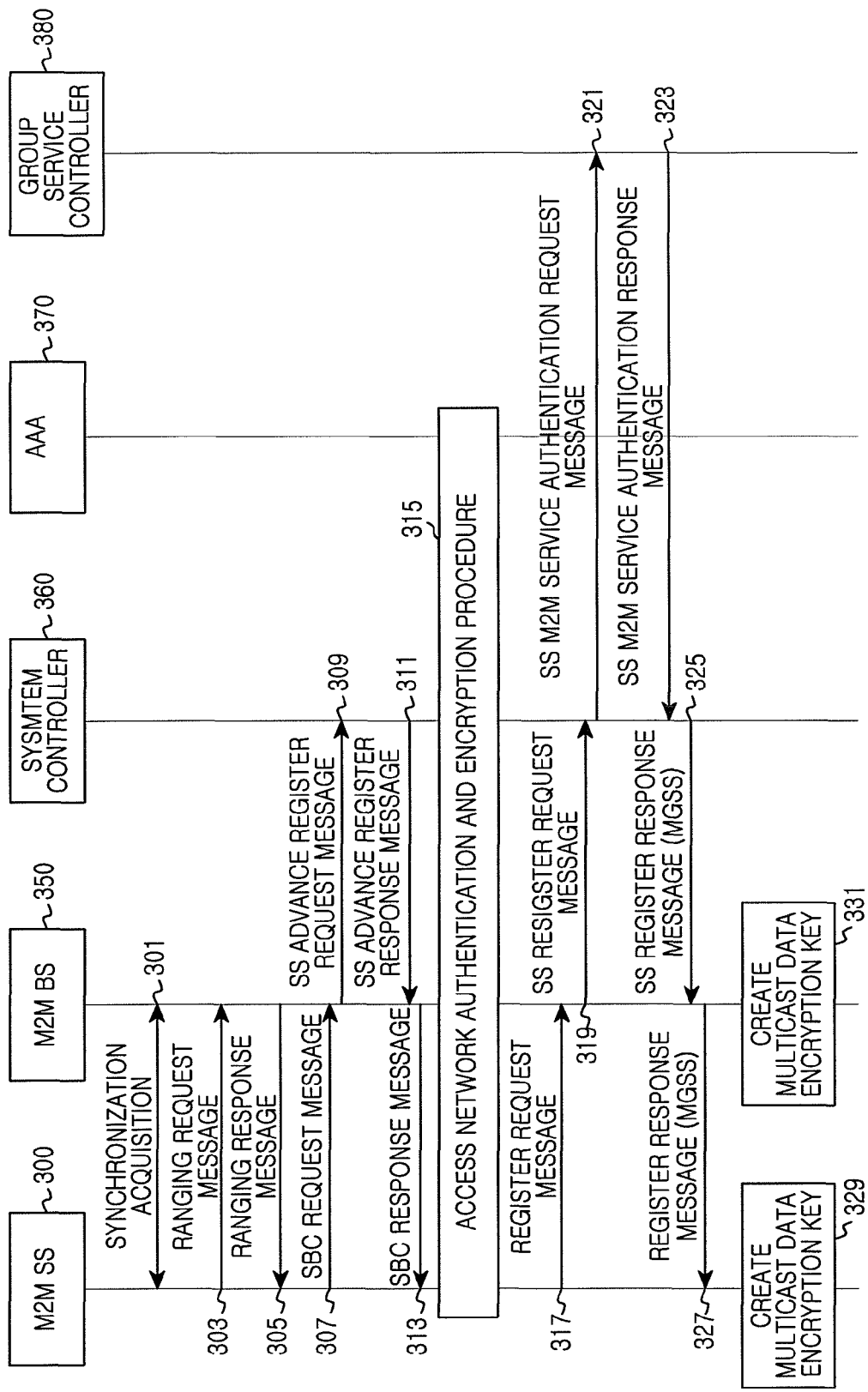
FIG. 3 illustrates a signal exchange of an M2M SS, M2M BS, system controller, AAA, and group service controller, for transmitting/receiving an M2M service group security seed in an M2M communication system according to a second exemplary embodiment of the present disclosure.

FIG. 3 illustrates a signal exchange of an M2M SS, M2M BS, system controller, AAA, and group service controller, for transmitting/receiving an M2M service group security seed in an M2M communication system according to a second exemplary embodiment of the present disclosure.

Referring to FIG. 3, in step 301, the M2M SS 300 acquires synchronization for the M2M BS 350 and, in step 303, the M2M SS 300 sends a ranging request message (RNG-REQ) to the M2M BS 350. Then, in step 305, in response to the ranging request message (RNG-REQ), the M2M BS 350 sends a ranging response message (RNG-RSP) to the M2M SS 300. Then, in step 307, the M2M SS 300 sends a Subscriber Station's Basic Capability negotiation request message (SBC-REQ) to the M2M BS 350. Then, in step 309, the M2M BS 350 sends an advance register request message for the M2M SS 300 to a system controller 360. Then, in step 311, the system controller 360 sends an advance register response message for the M2M SS 300 to the M2M BS 350. Also, the system controller 360 provides information of the M2M SS 300 to the AAA 370 (not shown) so as to process access network authorization for the M2M SS 300. Then, in step 313, the M2M BS 350 sends a subscriber station's basic capability negotiation response message (SBC-RSP) as a response of step 307 to the M2M SS 300. Next, in step 315, the M2M SS 300, the M2M BS 350, the system controller 360, and the AAA 370 perform an access network authentication and encryption procedure for the M2M SS 300. The access network authentication and encryption procedure of step 315 is the same as step 215 and steps 215-1 to 215-6 of FIG. 2.

Thereafter, in step 317, the M2M SS 300 sends a register request message (REG-REQ) to the M2M BS 350. Then, in step 319, the M2M BS 350 sends a subscriber station register request message for the M2M SS 300, to the system controller 360. Then, in step 321, the system controller 360 sends an M2M service authentication request message for the M2M SS 300 to the group service controller 380 that controls a device communication service of the M2M SS 300. Then, in step 323, the group service controller 380 performs M2M service authentication for the M2M SS 300 and, when the M2M SS 300 has joined a multicast service, the group service controller 380 sends the system controller 360 an M2M service authentication response message, which includes multicast service information of the M2M SS 300 of Table 1 and an M2M service authorization key and M2M service group security seed necessary for multicast service data encryption. According to realization, in the access network authentication and encryption procedure of step 315, when the M2M service authorization key is shared by the M2M SS 300, the M2M BS 350, the system controller 360, and the AAA 370, the M2M service authorization key may not be included in an M2M service authentication response message.

Then, in step 325, the system controller 360 transmits multicast service authentication information including the M2M service group security seed received from the group service controller 380, to the M2M BS 350 using a subscriber station register response message. Then, in step 327, the M2M BS 350 transmits the multicast service authentication information including the M2M service group security seed to the M2M SS 300 using a register response message. Then, in steps 329 and 331, the M2M SS 300 and the M2M BS 350 create multicast data encryption keys by Equation 1 above using the multicast service authentication information including the M2M service group security seed, respectively.

As another example, a procedure for acquiring information about a multicast service that the M2M SS 300 has joined and authentication information about the multicast service as in step 321 to step 323 of FIG. 3 can use message transaction in which the AAA 370 requests and the group service controller 380 responds. At this time, after receiving a forward of the multicast service authentication information from the AAA 370, the system controller 360 performs a procedure of step 325.

Figure 4:
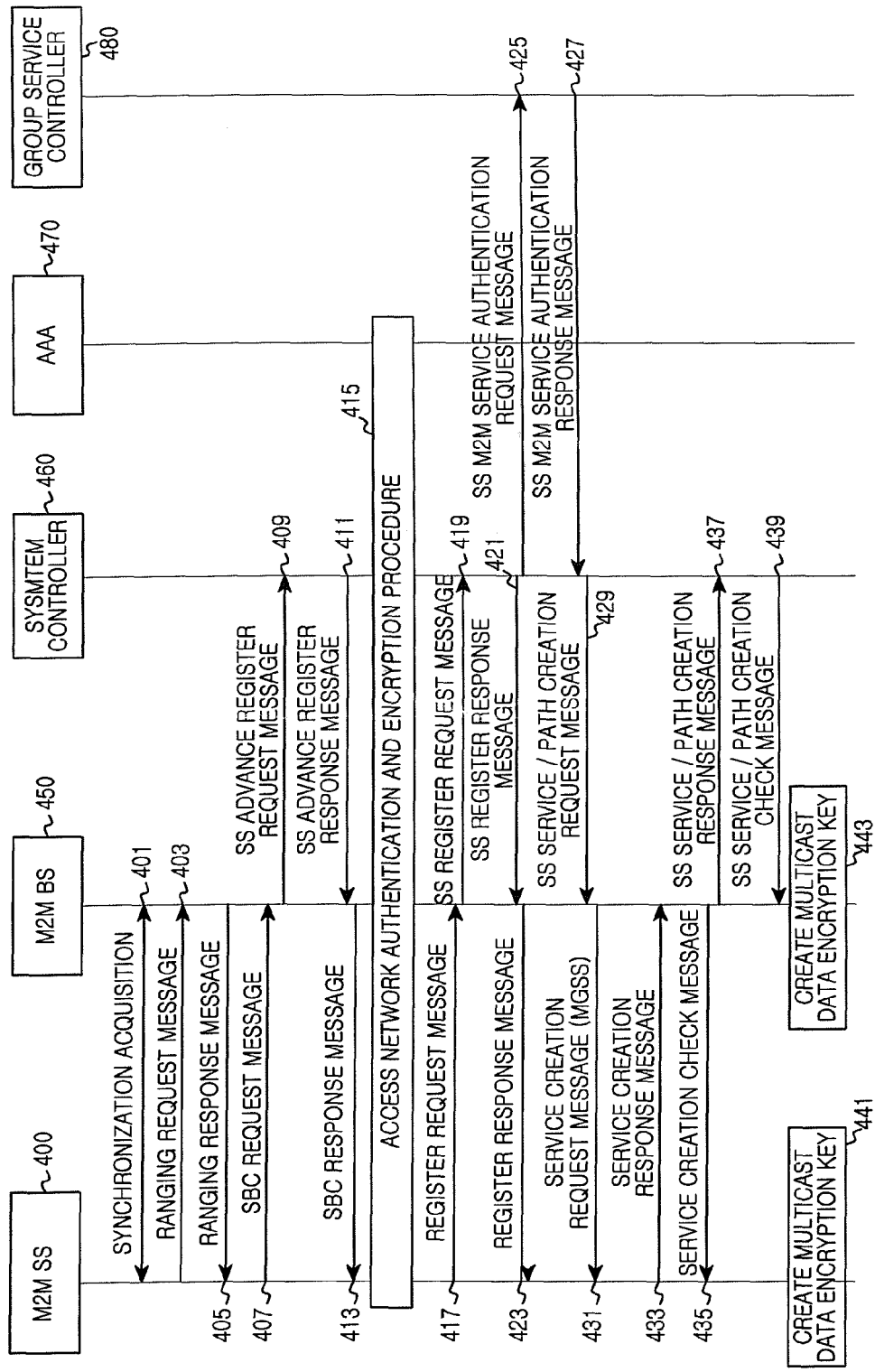
FIG. 4 illustrates a signal exchange of an M2M SS, M2M BS, system controller, AAA, and group service controller, for transmitting/receiving an M2M service group security seed in an M2M communication system according to a third exemplary embodiment of the present disclosure.

FIG. 4 illustrates a signal exchange of an M2M SS, M2M BS, system controller, AAA, and group service controller, for transmitting/receiving an M2M service group security seed in an M2M communication system according to a third exemplary embodiment of the present disclosure.

Referring to FIG. 4, in step 401, the M2M SS 400 acquires synchronization for the M2M BS 450 and, in step 403, the M2M SS 400 sends a ranging request message (RNG-REQ) to the M2M BS 450. Then, in step 405, in response to the ranging request message (RNG-REQ), the M2M BS 450 sends a ranging response message (RNG-RSP) to the M2M SS 400. Then, in step 407, the M2M SS 400 sends a Subscriber Station's Basic Capability negotiation request message (SBC-REQ) to the M2M BS 450. Then, in step 409, the M2M BS 450 sends an advance register request message for the M2M SS 400 to the system controller 460. Then, in step 411, the system controller 460 sends an advance register response message for the M2M SS 400 to the M2M BS 450. Also, the system controller 460 provides information of the M2M SS 400 to the AAA 470 (not shown) so as to process access network authorization for the M2M SS 400. Then, in step 413, the M2M BS 450 sends a subscriber station's basic capability negotiation response message (SBC-RSP) as a response of step 407 to the M2M SS 400. Next, in step 415, the M2M SS 400, the M2M BS 450, the system controller 460, and the AAA 470 perform an access network authentication and encryption procedure for the M2M SS 400. The access network authentication and encryption procedure of step 415 is the same as step 215 and steps 215-1 to 215-6 of FIG. 2.

Thereafter, in step 417, the M2M SS 400 sends a register request message (REG-REQ) to the M2M BS 450. Then, in step 419, the M2M BS 450 sends a subscriber station register request message for the M2M SS 400, to the system controller 460. Then, in step 421, the system controller 460 processes a register request for the M2M SS 400 and sends a subscriber station register response message to the M2M BS 450. Then, in step 423, the M2M BS 450 sends a register response message to the M2M SS 400. Alternatively, in step 425, the system controller 460 sends an M2M service authentication request message for the M2M SS 400 to the group service controller 480 that controls a device communication service of the M2M SS 400. Then, in step 427, the group service controller 480 performs M2M service authentication for the M2M SS 400 and, when the M2M SS 400 has joined a multicast service, the group service controller 480 sends the system controller 460 an M2M service authentication response message, which includes multicast service information of the M2M SS 400 of Table 1 and an M2M service authorization key and M2M service group security seed necessary for multicast service data encryption. According to realization, in the access network authentication and encryption procedure of step 415, when the M2M service authorization key is shared by the M2M SS 400, the M2M BS 450, the system controller 460, and the AAA 470, the M2M service authorization key may not be included in an M2M service authentication response message.

Then, in step 429, the system controller 460 sends a subscriber station service/path creation request message to the M2M BS 450 so as to create a service and path for the M2M SS 400. The subscriber station service/path creation request message includes the M2M service group security seed information of Table 1 that is received from the group service controller 480 in step 427. Then, in step 431, the M2M BS 450 sends a service creation request message including the M2M service group security seed information of Table 1, to the M2M SS 400. Then, in step 433, the M2M SS 400 sends a service creation response message to the M2M BS 450 and, in step 435, the M2M BS 450 sends a service creation check message to the M2M SS 400. Also, in step 437, the M2M BS 450 sends the system controller 460 a subscriber station service/path creation response message of informing that a service and path for the M2M SS 400 have been created. Then, in step 439, the system controller 460 sends a subscriber station service/path creation check message to the M2M BS 450, whereby a service flow is created for the M2M SS 400 and a path to support the service flow is created.

Then, in steps 441 and 443, the M2M SS 400 and the M2M BS 450 create multicast data encryption keys by Equation 1 above using the multicast service authentication information including the received M2M service group security seed.

As another example, a procedure for acquiring information about a multicast service that the M2M SS 400 has joined and authentication information about the multicast service as in step 425 to step 427 of FIG. 4 can use message transaction in which the AAA 470 requests and the group service controller 480 responds. At this time, after receiving a forward of the multicast service authentication information from the AAA 470, the system controller 460 performs a procedure of step 429.

Also, in the example of FIG. 4, a description has been made for a case where the system controller 460 and the M2M BS 450 send the service creation request message, thereby triggering service creation of the M2M SS 400, but, when the M2M SS 400 sends the service creation request message, thereby triggering service creation, the M2M service group security seed information of Table 1 is provided through the service creation response message that the M2M BS 450 sends the M2M SS 400.

Figure 5:
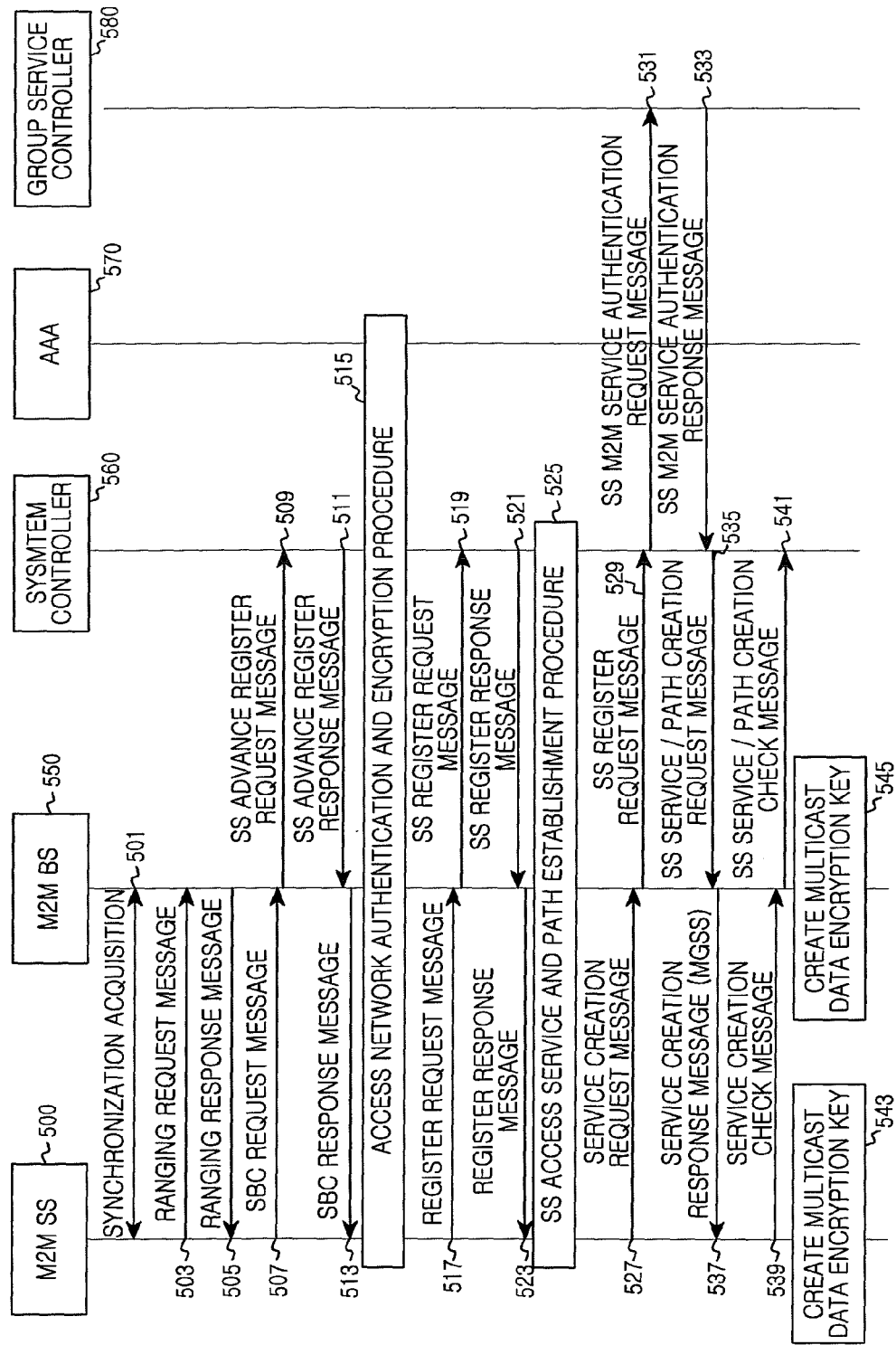
FIG. 5 illustrates a signal exchange of an M2M SS, M2M BS, system controller, AAA, and group service controller, for transmitting/receiving an M2M service group security seed in an M2M communication system according to a fourth exemplary embodiment of the present disclosure.

FIG. 5 illustrates a signal exchange of an M2M SS, M2M BS, system controller, AAA, and group service controller, for transmitting/receiving an M2M service group security seed in an M2M communication system according to a fourth exemplary embodiment of the present disclosure.

Referring to FIG. 5, in step 501, the M2M SS 500 acquires synchronization for the M2M BS 550 and, in step 503, the M2M SS 500 sends a ranging request message (RNG-REQ) to the M2M BS 550. Then, in step 505, in response to the ranging request message (RNG-REQ), the M2M BS 550 sends a ranging response message (RNG-RSP) to the M2M SS 500. Then, in step 507, the M2M SS 500 sends a Subscriber Station's Basic Capability negotiation request message (SBC-REQ) to the M2M BS 550. Then, in step 509, the M2M BS 550 sends an advance register request message for the M2M SS 500 to the system controller 560. Then, in step 511, the system controller 560 sends an advance register response message for the M2M SS 500 to the M2M BS 550. Also, the system controller 560 provides information of the M2M SS 500 to the AAA 570 (not shown) so as to process access network authorization for the M2M SS 500. Then, in step 513, the M2M BS 550 sends a subscriber station's basic capability negotiation response message (SBC-RSP) as a response of step 507 to the M2M SS 500. Next, in step 515, the M2M SS 500, the M2M BS 550, the system controller 560, and the AAA 570 perform an access network authentication and encryption procedure for the M2M SS 500. The access network authentication and encryption procedure of step 515 is the same as step 215 and steps 215-1 to 215-6 of FIG. 2.

Thereafter, in step 517, the M2M SS 500 sends a register request message (REG-REQ) to the M2M BS 550. Then, in step 519, the M2M BS 550 sends a subscriber station register request message for the M2M SS 500, to the system controller 560. Then, in step 521, the system controller 560 processes a register request for the M2M SS 500 and sends a subscriber station register response message to the M2M BS 550. Then, in step 523, the M2M BS 550 sends a register response message to the M2M SS 500. In step 525, the M2M SS 500 performs an access service and path establishment procedure of the M2M SS 500 with the system controller 560 through the M2M BS 550. A general data traffic of the M2M SS 500 is transmitted through the access service and path establishment procedure.

Thereafter, in step 527, the M2M SS 500 sends the M2M BS 550 a service creation request message for receiving a device communication service provided by the group service controller 580 and a multicast service. Then, in step 529, the M2M BS 550 sends a subscriber station service creation request message of the M2M SS 500 to the system controller 560 according to the service creation request message. Then, in step 531, the system controller 560 sends an M2M service authentication request message for the M2M SS 500 to the group service controller 580 that controls a device communication service of the M2M SS 500. Then, in step 533, the group service controller 580 performs M2M service authentication for the M2M SS 500 and, when the M2M SS 500 has joined a multicast service, the group service controller 580 sends the system controller 560 an M2M service authentication response message, which includes multicast service information of the M2M SS 500 of Table 1 and an M2M service authorization key and M2M service group security seed necessary for multicast service data encryption. According to realization, in the access network authentication and encryption procedure of step 515, when the M2M service authorization key is shared by the M2M SS 500, the M2M BS 550, the system controller 560, and the AAA 570, the M2M service authorization key may not be included in an M2M service authentication response message.

Then, in step 535, the system controller 560 sends a subscriber station service creation response message to the M2M BS 550. The subscriber station service creation response message includes the M2M service group security seed information of Table 1 that is received from the group service controller 580 in step 533. Then, in step 537, the M2M BS 550 sends a service creation response message including the M2M service group security seed information of Table 1 to the M2M SS 500. Then, in step 539, the M2M SS 500 sends a service creation check message to the M2M BS 550 and, in step 541, the M2M BS 550 sends a subscriber station service creation check message to the system controller 560. Also, in steps 543 and 545, the M2M SS 500 and the M2M BS 550 create multicast data encryption keys by Equation 1 above using the multicast service authentication information including the received M2M service group security seed.

Figure 6:
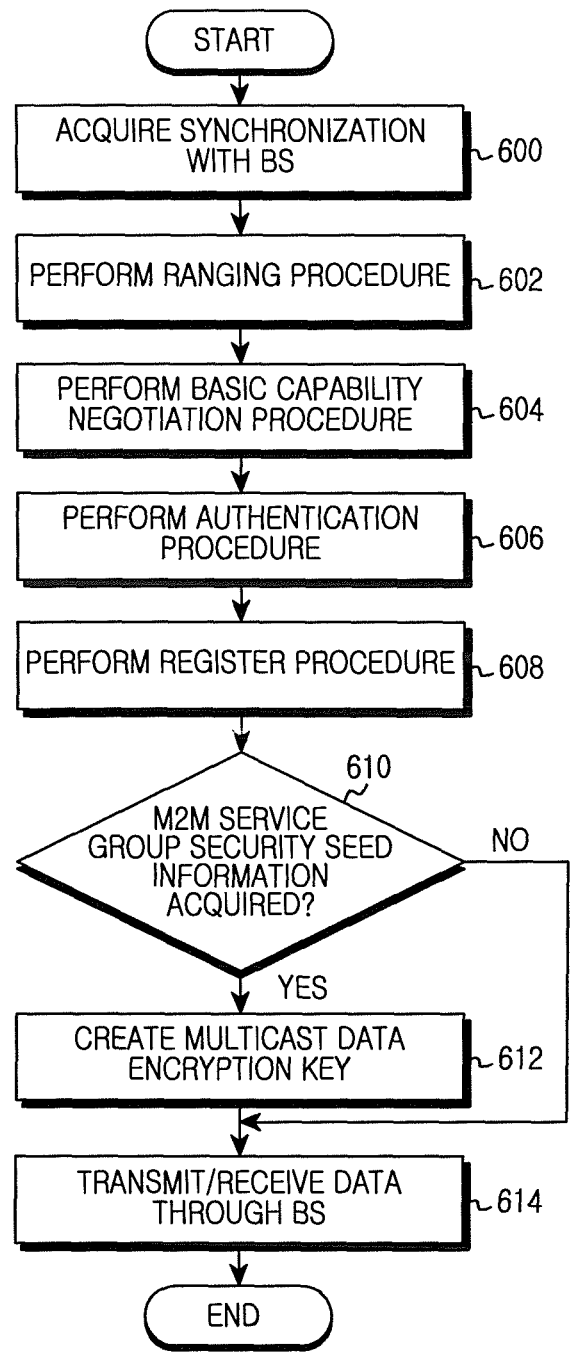
FIG. 6 illustrates an operation procedure of an M2M SS for first creating a multicast data encryption key in an M2M communication system according to an exemplary embodiment of the present disclosure.

FIG. 6 illustrates an operation procedure of an M2M SS for first creating a multicast data encryption key in an M2M communication system according to an exemplary embodiment of the present disclosure.

Referring to FIG. 6, in step 600, the M2M SS acquires synchronization with an M2M BS and, in step 602, performs a ranging procedure with the M2M BS. Then, in step 604, the M2M SS performs a basic capability negotiation procedure with the M2M BS and, in step 606, performs an authentication procedure. Then, in step 608, the M2M SS performs a register procedure with the M2M BS, thereby completing a network entry procedure. In step 610, the M2M SS determines if it has acquired M2M service group security seed information about a multicast group that itself has joined. As aforementioned in FIGS. 2 to 5, the M2M service group security seed information is acquired during the register procedure of step 608 (referring to FIG. 2 or FIG. 3) or is acquired through a service creation procedure after the register procedure of step 608 (referring to FIG. 4 or FIG. 5) (not shown). If it is determined in step 610 that the M2M SS has acquired the M2M service group security seed information about the multicast group, in step 612, the M2M SS creates a multicast data encryption key by Equation 1 above and, in step 614, the M2M SS performs data transmission/reception with the M2M BS. If receiving multicast data through the M2M BS in step 614, the M2M SS decrypts the multicast data using the multicast data encryption key created in step 612.

The method described above in relation to FIG. 6 may be provided as one or more instructions in one or more software modules, or computer programs stored in an electronic device including the M2M SS.

Figure 7:
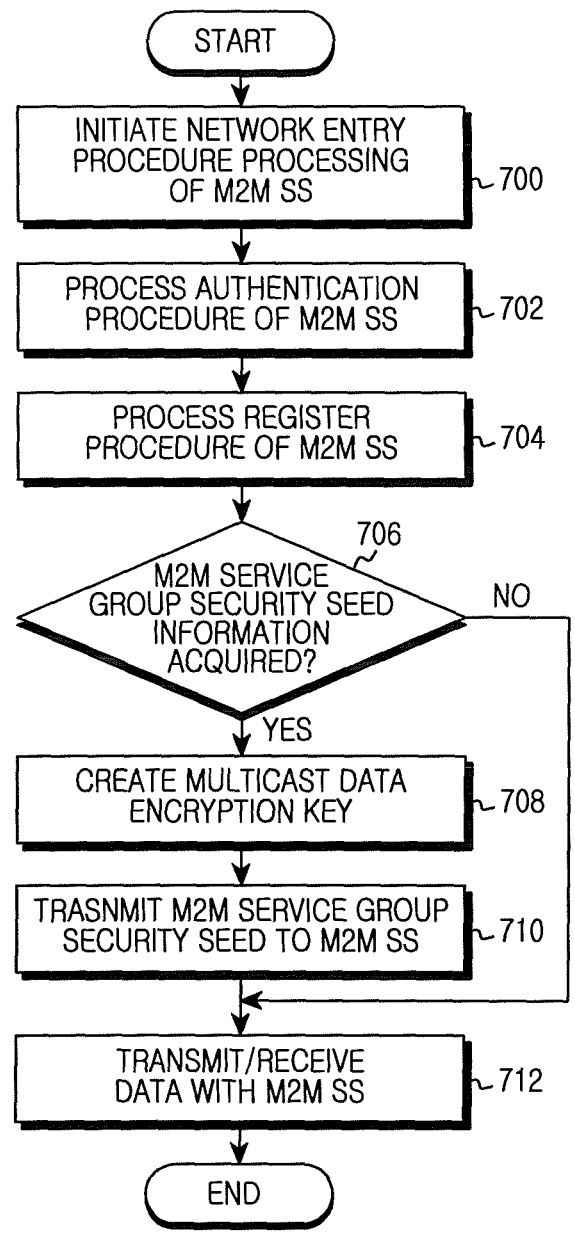
FIG. 7 illustrates an operation procedure of an M2M BS for first creating a multicast data encryption key in an M2M communication system according to an exemplary embodiment of the present disclosure.

FIG. 7 illustrates an operation procedure of an M2M BS for first creating a multicast data encryption key in an M2M communication system according to an exemplary embodiment of the present disclosure.

Referring to FIG. 7, in step 700, the M2M BS performs network entry procedure processing of an M2M SS that intends to register to a network service through the M2M BS. Then, in step 702, the M2M BS processes an authentication procedure for the M2M SS during the network entry procedure and, in step 704, the M2M BS processes a register procedure of the M2M SS. Then, in step 706, the M2M BS determines if it has acquired M2M service group security seed information about a multicast group that the M2M SS has joined. The M2M service group security seed information is acquired through the system controller during the register procedure of the M2M SS (referring to FIG. 2 or FIG. 3) or a service creation procedure of the M2M SS (referring to FIG. 4 or FIG. 5). Then, in step 708, the M2M BS creates a multicast data encryption key by Equation 1 above using the M2M service group security seed information. Also, in step 710, the M2M BS transmits the M2M service group security seed information to the M2M SS during the register procedure of the M2M SS or the service creation procedure of the M2M SS. In step 712, the M2M BS performs data transmission/reception with the M2M SS. Particularly, when having to transmit multicast data of a multicast group that the M2M SS has joined, the M2M BS encrypts the multicast data through the multicast data encryption key created in step 708.

In FIG. 7, a description has been made for an operation in which the M2M BS first receives an M2M service group security seed for a multicast group and creates a multicast data encryption key. In a case where the M2M BS has already possessed the M2M service group security seed for the multicast group, the M2M BS does not receive the M2M service group security seed through the network entry procedure or service creation procedure of the M2M SS. Instead, the system controller receives identifier information of a multicast group that the M2M SS has joined, thereby being capable of deciding an M2M service group security seed to be applied to the M2M SS.

The method described above in relation to FIG. 7 may be provided as one or more instructions in one or more software modules, or computer programs stored in an electronic device including the M2M BS.

Figure 8:
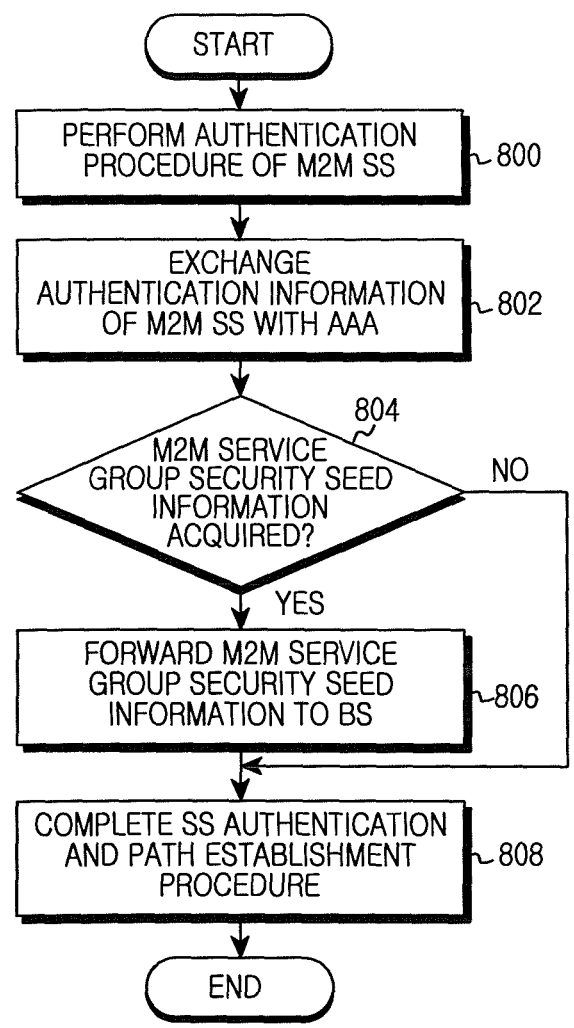
FIG. 8 illustrates an operation procedure of a system controller for processing an M2M service group security seed in an M2M communication system according to an exemplary embodiment of the present disclosure.

FIG. 8 illustrates an operation procedure of a system controller for processing an M2M service group security seed in an M2M communication system according to an exemplary embodiment of the present disclosure.

Referring to FIG. 8, in step 800, the system controller performs an authentication procedure of the M2M SS forwarded through the M2M BS. In step 802, the system controller exchanges authentication information about the M2M SS with the AAA. In step 804, the system controller determines if it has acquired M2M service group security seed information about a multicast group that the M2M SS has joined. A procedure of acquiring the M2M service group security seed information is the same as described in FIG. 2 to FIG. 5. Then, if so, in step 806, the system controller forwards the M2M service group security seed information of Table 1 to the M2M BS and, in step 808, the system controller completes an authentication and service path establishment procedure for the M2M SS.

The method described above in relation to FIG. 8 may be provided as one or more instructions in one or more software modules, or computer programs stored in an electronic device including the system controller.

Figure 9:
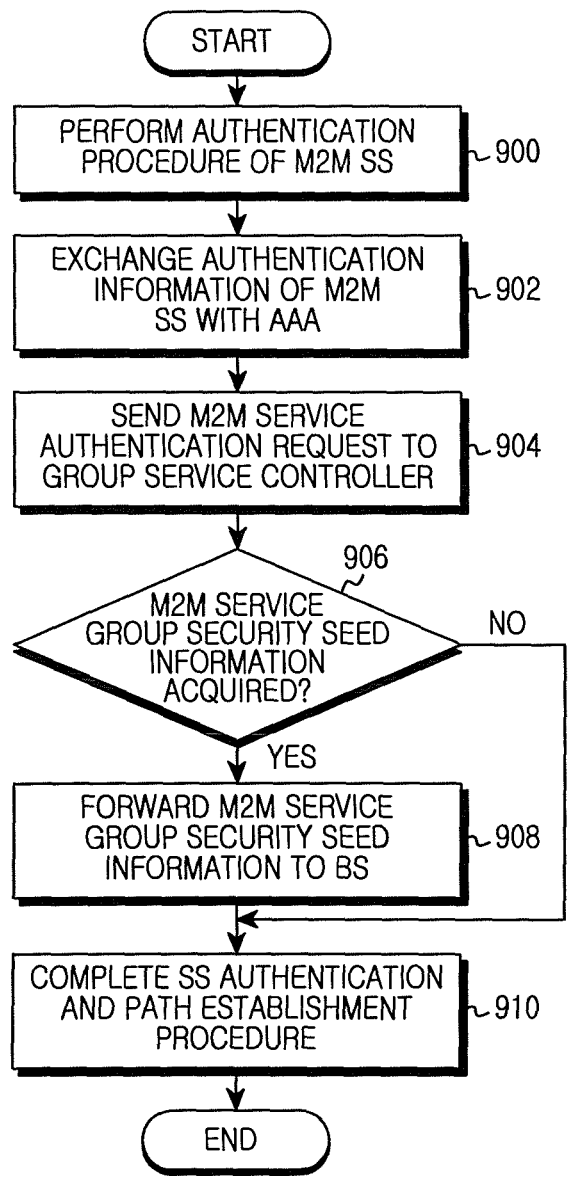
FIG. 9 illustrates an operation procedure of a system controller for processing an M2M service group security seed in an M2M communication system according to another exemplary embodiment of the present disclosure.

FIG. 9 illustrates an operation procedure of a system controller for processing an M2M service group security seed in an M2M communication system according to another exemplary embodiment of the present disclosure.

Referring to FIG. 9, in step 900, the system controller performs an authentication procedure of the M2M SS forwarded through the M2M BS. In step 902, the system controller exchanges authentication information about the M2M SS with the AAA. In step 904, the system controller sends an M2M service authentication request for the M2M SS to the group service controller and, in step 906, the system controller determines if it has acquired M2M service group security seed information about a multicast group that the M2M SS has joined. A procedure of acquiring the M2M service group security seed information is the same as described in FIG. 2 to FIG. 5. Then, if so, in step 908, the system controller forwards the M2M service group security seed information of Table 1 to the M2M BS and, in step 910, the system controller completes an authentication and service path establishment procedure for the M2M SS.

The method described above in relation to FIG. 9 may be provided as one or more instructions in one or more software modules, or computer programs stored in an electronic device including the system controller.

Figure 10:
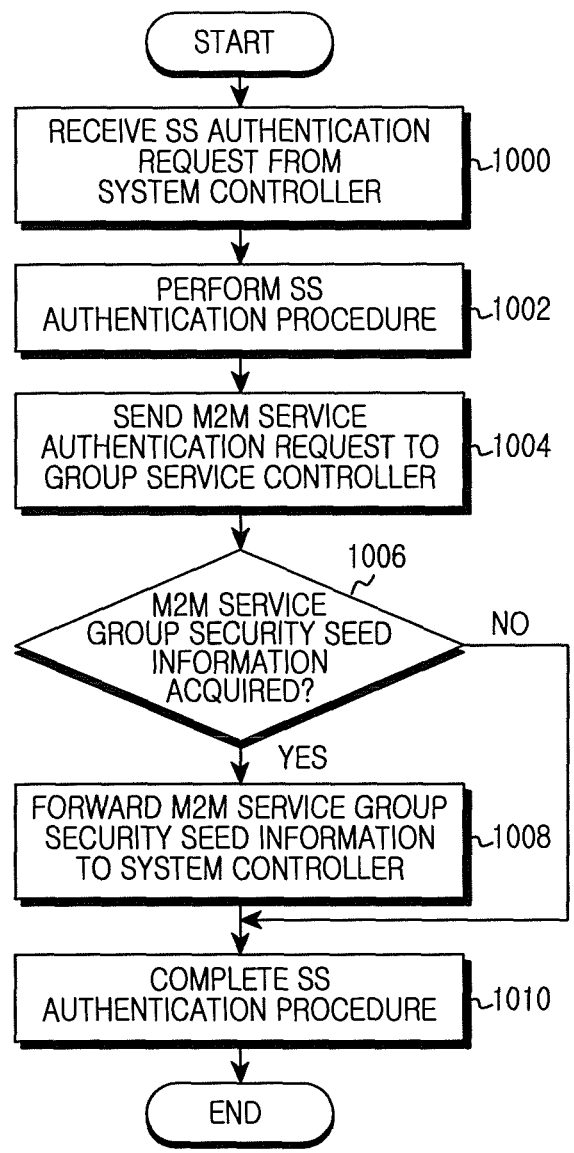
FIG. 10 illustrates an operation procedure of an AAA for processing an M2M service group security seed in an M2M communication system according to an exemplary embodiment of the present disclosure.

FIG. 10 illustrates an operation procedure of an AAA for processing an M2M service group security seed in an M2M communication system according to an exemplary embodiment of the present disclosure.

Referring to FIG. 10, in step 1000, the AAA processes an authentication request for the M2M SS from the system controller and, in step 1002, the AAA performs an access network authentication procedure for the M2M SS. In step 1004, the AAA sends an M2M service authentication request for the M2M SS to the group service controller. Step 1004 is a case where the AAA directly triggers an M2M service authentication request or a case where the AAA forwards an M2M service authentication request that the system controller triggers. In step 1006, the AAA determines if it has acquired M2M service group security seed information about a multicast group that the M2M SS has joined. If it is determined in step 1006 that the AAA has acquired the M2M service group security seed information, in step 1008, the AAA transmits the M2M service group security seed information of Table 1 to the system controller. In step 1010, the AAA completes an authentication procedure for the M2M SS.

The method described above in relation to FIG. 10 may be provided as one or more instructions in one or more software modules, or computer programs stored in an electronic device including the AAA server.

Figure 11:
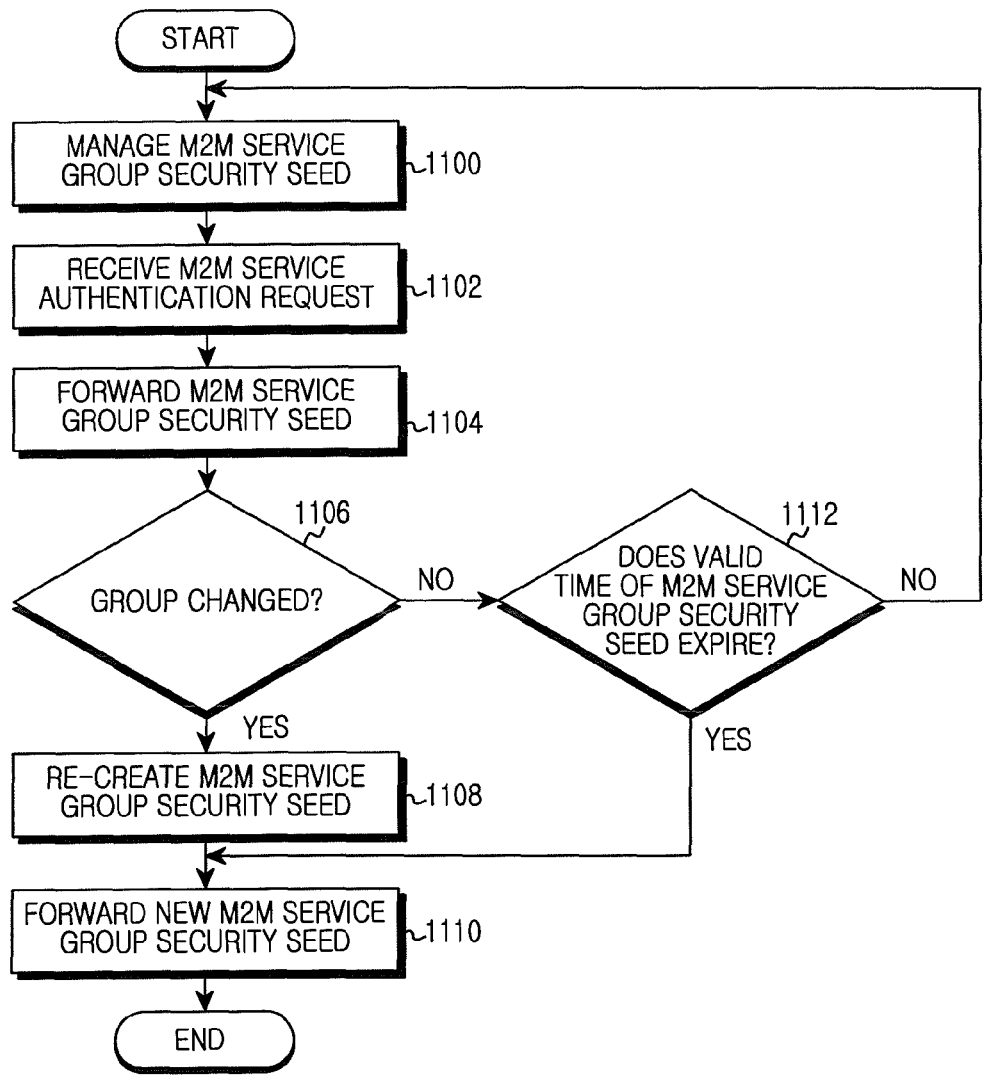
FIG. 11 illustrates an operation procedure of a group service controller for processing an M2M service group security seed in an M2M communication system according to an exemplary embodiment of the present disclosure.

FIG. 11 illustrates an operation procedure of a group service controller for processing an M2M service group security seed in an M2M communication system according to an exemplary embodiment of the present disclosure.

Referring to FIG. 11, in step 1100, the group service controller manages a multicast service of device communication, a multicast group, and M2M service group security seed information of the multicast group. If the group service controller receives an M2M service authentication request for the M2M SS in step 1102, in step 1104, the group service controller forwards M2M service group security seed information of Table 1 about a multicast group that the M2M SS has joined.

After that, in step 1106, the group service controller determines if there is a change of the multicast group. The change of the multicast group corresponds to a case where an M2M SS having joined a group withdraws or a new M2M SS joins. If it is determined in step 1106 that there is the change of the multicast group, in step 1108, the group service controller newly creates an M2M service group security seed for the changed multicast group. In step 1110, the group service controller forwards information of the newly created M2M service group security seed to the service controller or the AAA. Or, if it is determined in step 1106 that there is not the change of the multicast group, in step 1112, the group service controller determines if a valid time for the M2M service group security seed expires. If it is determined in step 1112 that the valid time of the M2M service group security seed expires, the group service controller proceeds to step 1108 and creates a new M2M service group security seed. In contrast, if it is determined in step 1112 that the valid time of the M2M service group security seed does not expire, the group service controller returns to step 1100. In FIG. 11, an M2M service group security seed re-created due to a change of a multicast group or the expiration of a valid time of an M2M service group security seed should be unicasted or multicasted to all M2M SSs within the multicast group. For example, because there is not a need to transmit the re-created M2M service group security seed to an M2M SS having withdrawn from the multicast group at group change, at this time, the re-created M2M service group security seed is unicasted to each of the remnant M2M SSs within the multicast group. The M2M service group security seed re-created due to the expiration of the valid time of the M2M service group security seed (no change of the multicast group) can be multicasted through a control message (e.g., a Dynamic Service Change (DSC) message) or can be multicasted through multicast data.

The method described above in relation to FIG. 11 may be provided as one or more instructions in one or more software modules, or computer programs stored in an electronic device including the group service controller.

Figure 12:
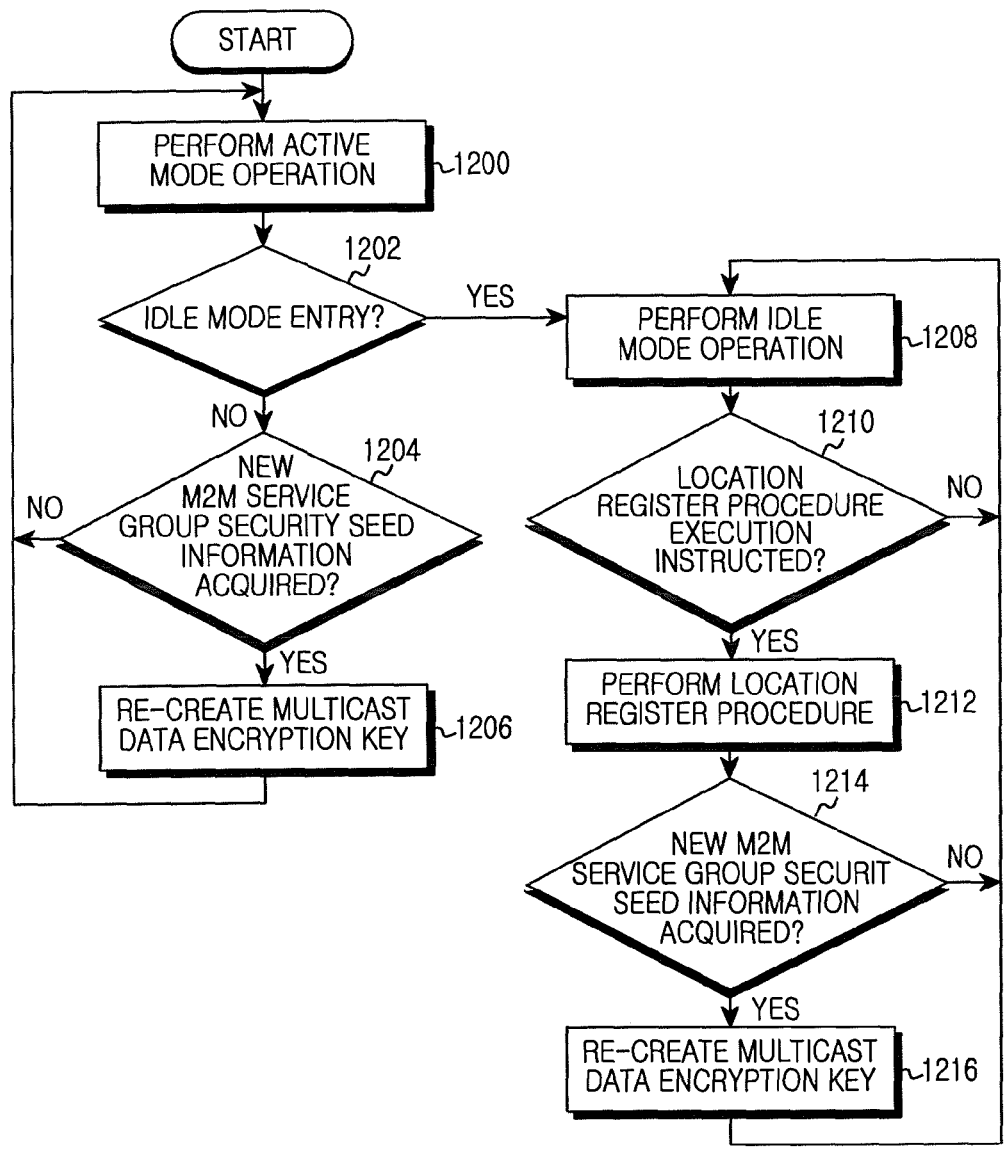
FIG. 12 illustrates an operation procedure of an M2M SS for updating a multicast data encryption key in an M2M communication system according to an exemplary embodiment of the present disclosure.

FIG. 12 illustrates an operation procedure of an M2M SS for updating a multicast data encryption key in an M2M communication system according to an exemplary embodiment of the present disclosure.

Referring to FIG. 12, in step 1200, the M2M SS performs an operation of an active mode. The operation of the active mode means performing unicast data transmission/reception with the M2M BS. In step 1202, the M2M SS determines if it enters an idle mode out of the active mode. If not entering the idle step in step 1202, in step 1204, the M2M SS determines if it has acquired new M2M service group security seed information. The new M2M service group security seed information is forwarded through a service change request message transmitted by the M2M BS or a message exchanged in the authentication procedure of step 606 or multicast data. If it is determined in step 1204 to have acquired the new M2M service group security seed information, in step 1206, the M2M SS again creates a multicast data encryption key by Equation 1 above. If it is determined in step 1202 that the M2M SS enters the idle mode, the M2M SS proceeds to step 1208 and performs an idle mode operation. Then, in step 1210, the M2M SS determines if it receives a paging message of instructing location register procedure execution. If it is determined in step 1210 that the location register procedure execution is instructed, in step 1212, the M2M SS performs a location register procedure. Then, in step 1214, the M2M SS determines if it acquires new M2M service group security seed information during the location register procedure. The new M2M service group security seed of step 1214 is forwarded through a ranging response message. If it is determined in step 1214 that the new M2M service group security seed is acquired, in step 1216, the M2M SS again creates a multicast data encryption key by Equation 1 above.

Alternatively, in step 1210, instead of instructing the location register procedure execution in order to instruct an idle mode subscriber station to update a multicast data encryption key, the multicast data encryption key updating instruction can be included in a paging message itself.

The method described above in relation to FIG. 12 may be provided as one or more instructions in one or more software modules, or computer programs stored in an electronic device including the M2M SS.

Figure 13:
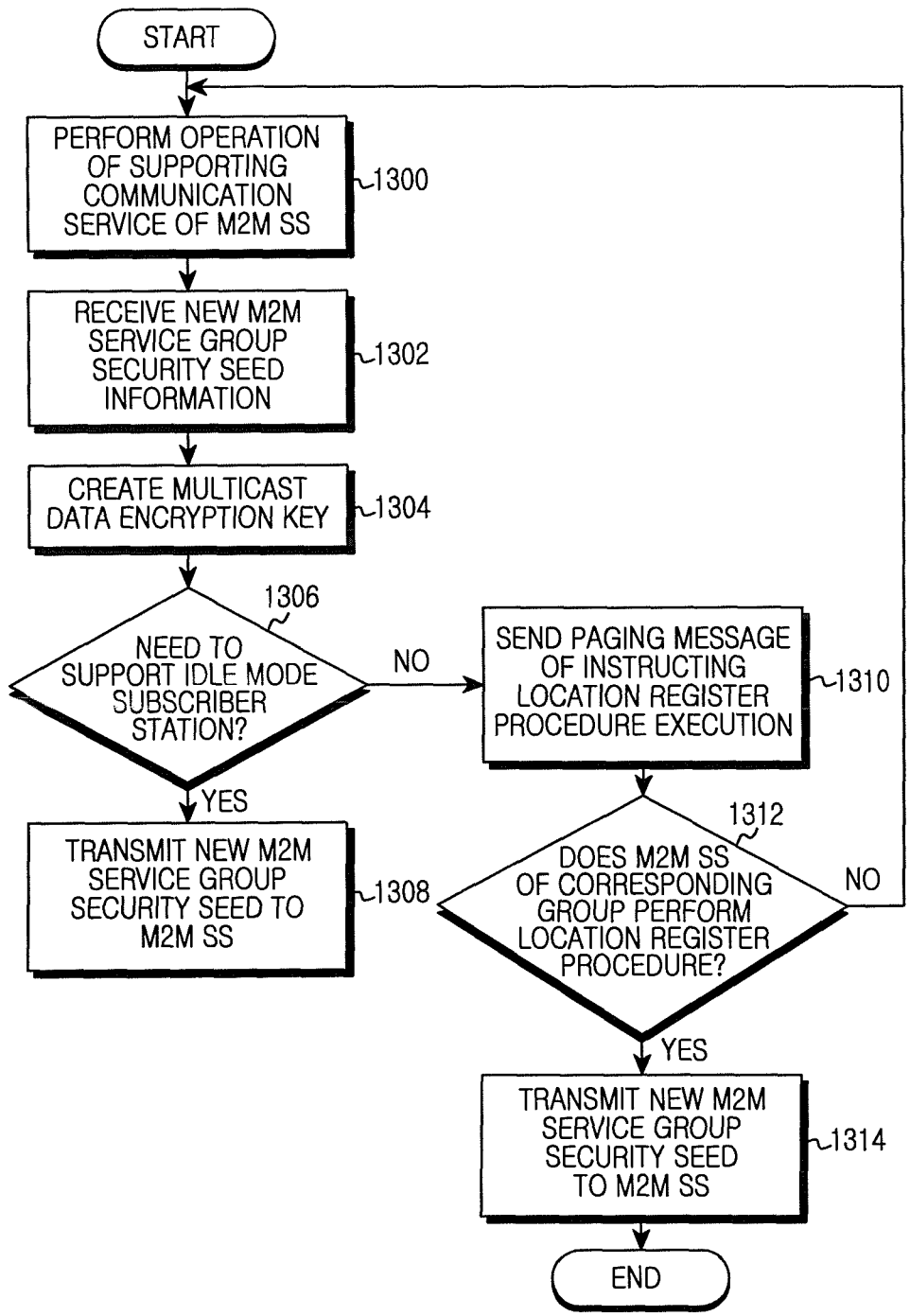
FIG. 13 illustrates an operation procedure of an M2M BS for updating a multicast data encryption key in an M2M communication system according to an exemplary embodiment of the present disclosure.

FIG. 13 illustrates an operation procedure of an M2M BS for updating a multicast data encryption key in an M2M communication system according to an exemplary embodiment of the present disclosure.

Referring to FIG. 13, in step 1300, the M2M BS performs an operation of supporting a communication service of an M2M SS such as data transmission/reception with the M2M SS and the like. Then, in step 1302, the M2M BS receives new M2M service group security seed information of Table 1 above from the system controller. Then, in step 1304, the M2M BS again creates a multicast data encryption key using a new M2M service group security seed. Then, in step 1306, the M2M BS determines if it has to transmit the new M2M service group security seed information to an idle mode subscriber station. Step 1306 is a case of receiving a paging request message of instructing the idle mode subscriber station to receive the M2M service group security seed information and update the multicast data encryption key, from the system controller (including a paging controller). If it is determined in step 1306 that the M2M BS does not have to instruct the idle mode subscriber station to update the multicast data encryption key, the M2M BS proceeds with step 1308 and transmits the received new M2M service group security seed information of step 1302 to an active mode subscriber station. Then, in step 1308, the M2M BS transmits the new M2M service group security seed information through a service change request message or a message exchanged in the authentication procedure of step 606 or multicast data.

In contrast, if it is determined in step 1306 that the M2M BS has to instruct the idle mode subscriber station to update the multicast data encryption key, the M2M BS proceeds to step 1310 and sends the idle mode subscriber station a paging message which includes information instructing location register procedure execution.

After that, in step 1312, the M2M BS determines if the idle mode subscriber station of a multicast group having to receive the new M2M service group security seed information performs a location register procedure. If it is determined in step 1312 that the idle mode subscriber station of the multicast group performs the location register procedure, in step 1314, the M2M BS transmits new M2M service group security seed information to the idle mode subscriber station using a ranging response message of the location register procedure.

Alternatively, in step 1310, instead of instructing the location register procedure execution in order for the idle mode subscriber station to update the multicast data encryption key, the multicast data encryption key updating instruction information can be included in a paging message itself.

To determine if the M2M BS has to forward the new M2M service group security seed information to the M2M SS in a multicast scheme in step 1308, an instructor about the instruction or non-instruction of multicast data encryption key updating resulting from group change should be received from a system controller in step 1302.

The method described above in relation to FIG. 13 may be provided as one or more instructions in one or more software modules, or computer programs stored in an electronic device including the M2M BS.

Figure 14:
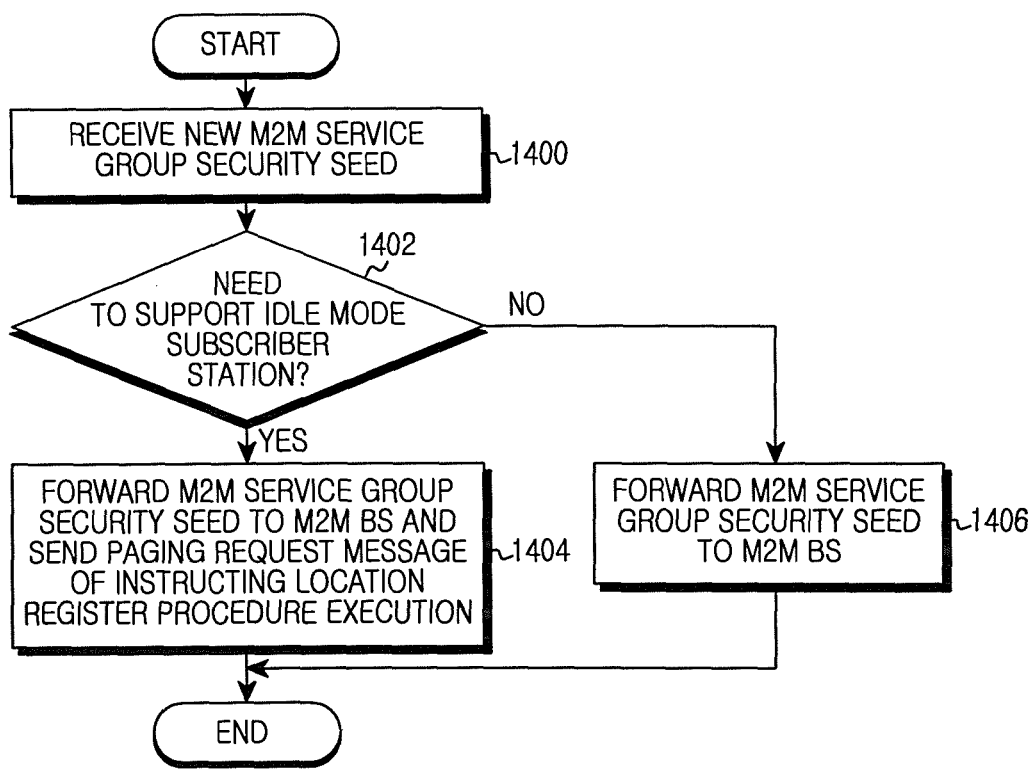
FIG. 14 illustrates an operation procedure of a system controller for processing the change of an M2M service group security seed in an M2M communication system according to an exemplary embodiment of the present disclosure.

FIG. 14 illustrates an operation procedure of a system controller for processing a change of an M2M service group security seed in an M2M communication system according to an exemplary embodiment of the present disclosure.

Referring to FIG. 14, in step 1400, the system controller receives a new M2M service group security seed from the group service controller or the AAA. Then, in step 1402, a paging controller managing an idle mode subscriber station among the system controller determines if it has to transmit the new M2M service group security seed even to the idle mode subscriber station. If it is determined in step 1402 that the system controller has to transmit the new M2M service group security seed even to the idle mode subscriber station, in step 1404, the system controller sends the new M2M service group security seed and a paging request message of instructing that the idle mode subscriber station has to update a multicast data encryption key through a location register procedure, to an M2M BS.

In contrast, if it is determined in step 1402 that the system controller does not have to transmit the new M2M service group security seed to the idle mode subscriber station, in step 1406, the system controller transmits the new M2M service group security seed to the M2M BS.

In step 1404 or step 1406, the system controller includes even an instructor about instruction or non-instruction of multicast data encryption key updating resulting from group change.

The method described above in relation to FIG. 14 may be provided as one or more instructions in one or more software modules, or computer programs stored in an electronic device including the system controller.

Figure 15:
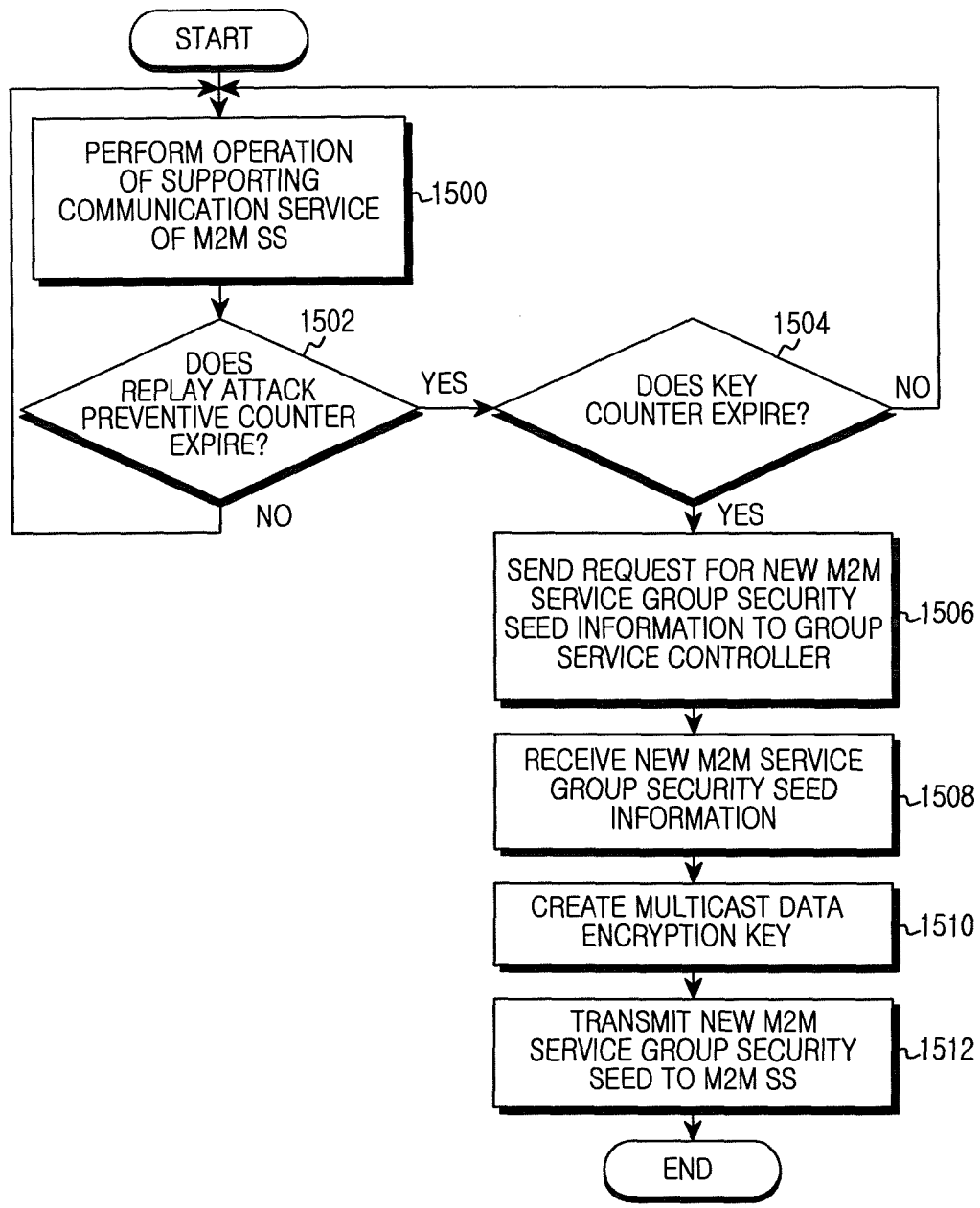
FIG. 15 illustrates an operation procedure of an M2M BS for updating a multicast data encryption key based on a key counter in an M2M communication system according to an exemplary embodiment of the present disclosure.

FIG. 15 illustrates an operation procedure of an M2M BS for updating a multicast data encryption key based on a key counter in an M2M communication system according to an exemplary embodiment of the present disclosure.

Referring to FIG. 15, in step 1500, the M2M BS performs an operation of supporting a communication service of the M2M SS including multicast data transmission. Then, in step 1502, the M2M BS determines if a replay attack preventive counter used for preventing replay attack to data transmitted to the M2M SS has expired. If it is determined in step 1502 that the replay attack preventive counter has not expired, the M2M BS performs an operation of step 1500. If it is determined in step 1502 that the replay attack preventive counter has expired, the M2M BS proceeds to step 1504 and determines if a key counter has expired. The key counter is used for creating a multicast data encryption key. If the key counter has expired, the M2M BS updates the multicast data encryption key. If the M2M BS does not have to update the multicast data encryption key by an M2M service authorization key or M2M service group security seed, the key counter is used for decreasing an overhead having to update the multicast data encryption key due to the expiration of the replay attack preventive counter used for replay attack prevention. The replay attack preventive counter and the key counter are initialized whenever the multicast data encryption key is updated.

Here, the multicast data encryption key having the key counter as an input value is created by Equation 2 below.

$$MGTEK=\text{Dot16KDF}(MAK, MGSS|\text{Key\_counter}|MGID|\text{"MGTEK"},128) \quad \text{[Eqn. 2]}$$

In Equation 2, the MGTEK is a multicast data encryption key, the MAK is an M2M service authorization key, the MGSS is an M2M service group security seed, the Key_counter is a key counter value, the MGID is a multicast group identifier, the "MGTEK" is a character string representing that it is a multicast data encryption key, and the Dot16KDF is an algorithm of creating a multicast data encryption key of 128 bits that inputs the MAK, the MGSS, the Key_counter, and the MGID.

If it is determined in step 1504 that the key counter has expired, the M2M BS recognizes that it has to update the multicast data encryption key and, in step 1506, sends a M2M service group security seed information request to the group service controller. In step 1506, the M2M service group security seed information request is sent to the group service controller through the system controller or the AAA. Then, in step 1508, the M2M BS receives new M2M service group security seed information of Table 1 above that the group service controller has transmitted. Then, in step 1510, the M2M BS again creates a multicast data encryption key using a new M2M service group security seed. Then, in step 1512, the M2M BS transmits the new M2M service group security seed information to the M2M SS. In step 1512, the M2M BS follows a procedure of FIG. 13.

If it is determined in step 1504 that the key counter has not expired, the M2M BS performs an operation of step 1500.

The method described above in relation to FIG. 15 may be provided as one or more instructions in one or more software modules, or computer programs stored in an electronic device including the M2M BS.

Figure 16:
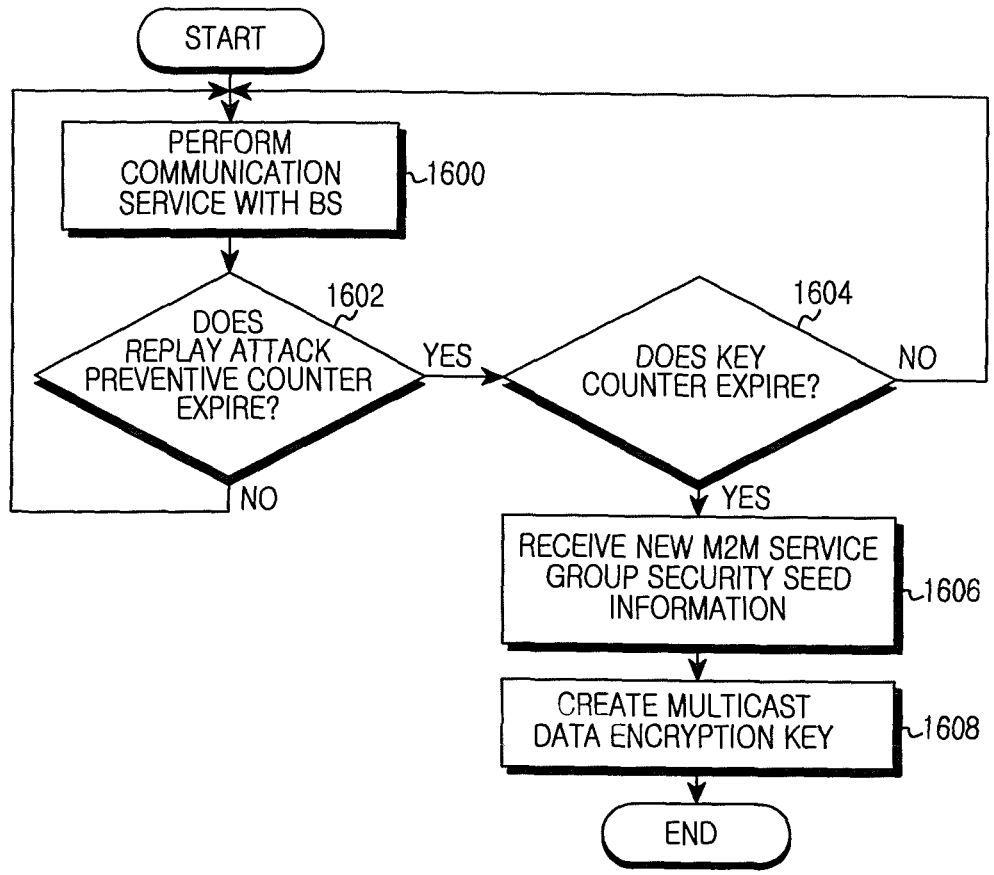
FIG. 16 illustrates an operation procedure of an M2M SS for updating a multicast data encryption key based on a key counter in an M2M communication system according to an exemplary embodiment of the present disclosure.

FIG. 16 illustrates an operation procedure of an M2M SS for updating a multicast data encryption key based on a key counter in an M2M communication system according to an exemplary embodiment of the present disclosure.

Referring to FIG. 16, in step 1600, the M2M SS is provided with a communication service including multicast data reception through the M2M BS. Then, in step 1602, the M2M SS determines if a replay attack preventive counter has expired. If it is determined in step 1602 that the replay attack preventive counter has not expired, the M2M SS performs an operation of step 1600. If it is determined in step 1602 that the replay attack preventive counter has expired, in step 1604, the M2M SS deter nines if a key counter has expired. If it is determined in step 1604 that the key counter has expired, in step 1606, the M2M SS receives new M2M service group security seed information of Table 1 transmitted through the M2M BS. Here, an operation of receiving the new M2M service group security seed information follows a procedure of FIG. 12. Then, in step 1608, the M2M SS updates a multicast data encryption key using the new M2M service group security seed.

If it is determined in step 1604 that the key counter has not expired, the M2M SS performs the operation of step 1600.

The method described above in relation to FIG. 16 may be provided as one or more instructions in one or more software modules, or computer programs stored in an electronic device including the M2M SS.

Figure 17:
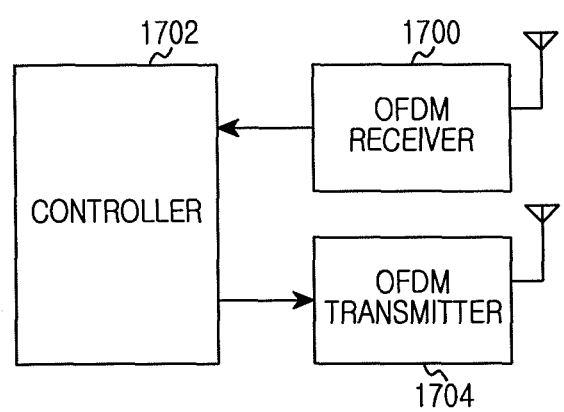
FIG. 17 illustrates a construction of an M2M SS apparatus according to an exemplary embodiment of the present disclosure.

FIG. 17 illustrates a construction of an M2M SS apparatus according to an exemplary embodiment of the present disclosure.

Referring to FIG. 17, the M2M SS apparatus includes a controller 1702, an OFDM receiver 1700, and an OFDM transmitter 1704.

The OFDM receiver 1700 receives a signal from the M2M BS based on an OFDM/OFDMA communication scheme. For example, at network entry procedure and M2M service register procedure execution, the OFDM receiver 1700 receives a message exchanged with the M2M BS and provides the message to the controller 1702.

The OFDM transmitter 1704 is provided with a message for a network entry procedure and M2M service register procedure from the controller 1702, and sends the message to the M2M BS based on the OFDM/OFDMA communication scheme.

In order to perform the network entry procedure and M2M service register procedure, the controller 1702 analyzes a corresponding control message provided from the OFDM receiver 1700, and creates a corresponding control message and outputs the control message to the OFDM transmitter 1704. Further to the present disclosure, the controller 1702 performs a digital signal processing process and controls operations of various processing modules to perform operations according to exemplary embodiments of the present disclosure described with reference to FIGS. 2 to 5 and FIGS. 6 and 12.

For example, at register procedure execution, the controller 1702 checks if information about a management region that an M2M SS belongs to is included within a corresponding control message from the M2M BS. When the information about the management region that the M2M SS belongs to is included within the corresponding control message, the controller 1702 performs communication based on the information about the management region that the M2M SS belongs to.

More particularly, the controller 1702 performs a synchronization procedure, a ranging procedure, a basic capability negotiation procedure, an authentication procedure, and a register procedure with the M2M BS, thereby completing a network entry procedure. Thereafter, the controller 1702 can send a service flow creation request to the M2M BS or receive a service flow creation request from the M2M BS. Also, the controller 1702 determines if it has acquired M2M service group security seed information about a multicast group through a register procedure of step 608 (referring to FIG. 2 or FIG. 3) or through a service flow creation procedure (referring to FIG. 4 or FIG. 5) as described in FIG. 2 or FIG. 5. And, the controller 1702 creates a multicast data encryption key by Equation 1 above using the M2M service group security seed information and performs data transmission/reception with the M2M BS.

Alternatively, the controller 1702 determines if it enters an idle mode out of an active mode and, when not entering the idle mode, the controller 1702 determines if it has received new M2M service group security seed information. The new M2M service group security seed information is forwarded through a service change request message transmitted by the M2M BS or a message exchanged in the authentication procedure. And, if a new M2M service group security seed is received, the controller 1702 again creates a multicast data encryption key using Equation 1 above. If the M2M SS enters the idle mode, the controller 1702 determines if it receives a paging message of instructing location register procedure execution during the idle mode and, if the location register procedure execution is instructed, the controller 1702 performs a location register procedure. The controller 1702 determines if it has received new M2M service group security seed information during the execution of the location register procedure. Here, the new M2M service group security seed is forwarded through a ranging response message. If the new M2M service group security seed is received, the controller 1702 again creates a multicast data encryption key by Equation 1 above.

Also, the controller 1702 determines if a replay attack preventive counter and a key counter have expired. According to the expiration or non-expiration of the replay attack preventive counter and the key counter, the controller 1702 receives new M2M service group security seed information of Table 1 transmitted through the M2M BS. Here, an operation of receiving the new M2M service group security seed information follows a procedure of FIG. 12. In addition, the controller 1702 updates a multicast data encryption key using the new M2M service group security seed.

Figure 18:
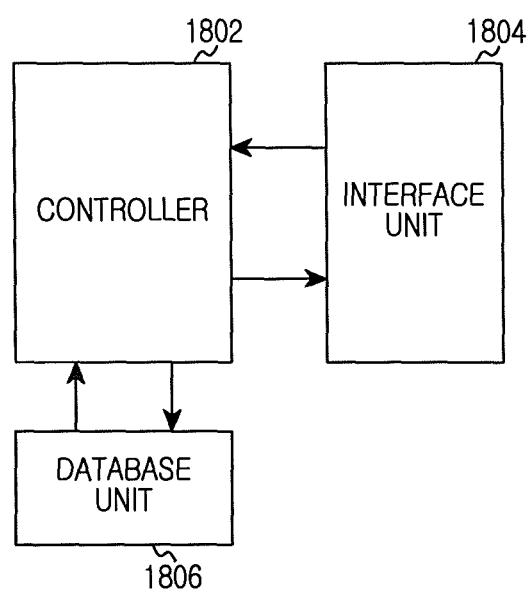
FIG. 18 illustrates a construction of an M2M BS, system controller, AAA, and group service controller apparatus according to an exemplary embodiment of the present disclosure.

FIG. 18 illustrates a construction of an M2M BS, system controller, AAA, and group service controller apparatus according to an exemplary embodiment of the present disclosure. The apparatus can be one of an M2M BS, a system controller, an AAA, and a group service controller.

Referring to FIG. 18, the apparatus includes a controller 1802, an interface unit 1804, and a database unit 1806.

The controller 1802 controls a general operation of a corresponding network entity (e.g., an M2M BS, a system controller, an AAA, or a group service controller), and the interface unit 1804 takes charge of signal transmission based on a corresponding protocol between network entities. In addition, the database unit 1806 stores data generated during a corresponding network entity operation. For instance, the database unit 1806 stores M2M service group security seed information provided from an upper network entity.

More particularly, the controller 1802 of the M2M BS performs a network entry procedure (including a synchronization procedure, a ranging procedure, a basic capability negotiation procedure, an authentication procedure, a register procedure and the like) of an M2M SS which intends to register to a network service. In addition, the controller 1802 determines if it has M2M service group security seed information about a multicast group that an M2M SS has joined. The M2M service group security seed information is acquired through the system controller during the register procedure of the M2M SS (referring to FIG. 2 or FIG. 3) or the service creation procedure of the M2M SS (referring to FIG. 4 or FIG. 5). The controller 1802 creates a multicast data encryption key by Equation 1 above using the M2M service group security seed information.

The controller 1802 of the system controller performs an authentication procedure of an M2M SS forwarded through the M2M BS, and exchanges authentication information about the M2M SS with the AAA. And, the controller 1802 determines if it has acquired M2M service group security seed information about a multicast group that the M2M SS has joined, from the AAA. A procedure of acquiring the M2M service group security seed information is the same as described in FIG. 2 to FIG. 5.

The controller 1802 of the AAA processes an authentication request for an M2M SS from the system controller, and performs an access network authentication procedure for the M2M SS. The controller 1802 sends an M2M service authentication request for the M2M SS to the group service controller. This is a case where the AAA directly triggers an M2M service authentication request or a case where the AAA forwards an M2M service authentication request that the system controller triggers. The controller 1802 determines if it has acquired M2M service group security seed information about a multicast group that the M2M SS has joined. If it has acquired the M2M service group security seed information, the controller 1802 transmits the M2M service group security seed information of Table 1 to the system controller.

The controller 1802 of the group service controller manages a multicast service of device communication, a multicast group, and M2M service group security seed information of the multicast group. That is, if receiving M2M service authentication request for the M2M SS, the controller 1802 forwards the M2M service group security seed information of Table 1 about the multicast group that the M2M SS has joined. And, the controller 1802 determines if there is a change of the multicast group. The change of the multicast group corresponds to a case where the M2M SS having joined the group withdraws or a new M2M SS joins. If there is the change of the multicast group, the controller 1802 newly creates an M2M service group security seed for the multicast group and forwards the created M2M service group security seed to the service controller or the AAA. In contrast, if there is not the change of the multicast group, the controller 1802 determines if a valid time for the M2M service group security seed expires and, when the valid time of the M2M service group security seed expires, the controller 1802 creates a new M2M service group security seed.

The controller 1802 of the M2M BS determines if it has to transmit new M2M service group security seed information in an idle mode. That is, the controller 1802 can receive a paging request message of instructing an idle mode subscriber station to receive the M2M service group security seed information and update a multicast data encryption key from the system controller (including a paging controller). In the case of not having to instruct the idle mode subscriber station to update the multicast data encryption key, the controller 1802 transmits the received new M2M service group security seed information to an active mode subscriber station. In contrast, in the case of having to instruct even the idle mode subscriber station to update the multicast data encryption key, the controller 1802 sends a paging message including information instructing location register procedure execution, to the idle mode subscriber station. After that, the controller 1802 determines if the idle mode subscriber station of a multicast group having to receive the new M2M service group security seed information performs a location register procedure. If it is determined that the idle mode subscriber station of the multicast group performs a location register procedure, the controller 1802 transmits new M2M service group security seed information to the idle mode subscriber station using a ranging response message of a location register procedure. According to realization, instead of instructing location register procedure execution in order for the idle mode subscriber station to update a multicast data encryption key, the multicast data encryption key updating instruction information can be included in the paging, message itself.

The controller 1802 of the system controller receives a new M2M service group security seed from the group service controller or the AAA, and determines if it has to transmit the new M2M service group security seed even to an idle mode subscriber station. And, if it is determined to have to transmit the new M2M service group security seed even to the idle mode subscriber station, the controller 1802 sends the new M2M service group security seed and a paging request message of instructing the idle mode subscriber station to have to update the multicast data encryption key through a location register procedure, to the M2M BS.

Alternatively, the controller 1802 of the M2M BS determines if a replay attack preventive counter and a key counter used for preventing a replay attack to data transmitted to the M2M SS have expired, and updates the multicast data encryption key. The key counter is used for creating a multicast data encryption key. Additionally, if the key counter has expired, the M2M BS recognizes that it has to update the multicast data encryption key, sends a request for the M2M service group security seed information to the group service controller, receives the new M2M service group security seed information of Table 1 transmitted by the group service controller, again creates a multicast data encryption key using the new M2M service group security seed, and transmits the new M2M service group security seed information to the M2M SS.

As described above, exemplary embodiments of the present disclosure have an advantage of being capable of preventing limited data from being exposed by an unspecific device and effectively transmitting data, by applying a way of creating and maintaining a multicast data encryption key in consideration of a case of multicasting the same data to devices belonging to a group in an M2M communication system.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

Embodiments of the present disclosure according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present disclosure.

Such software may be stored in the form of volatile or non-volatile storage such as, for example, a storage device like a ROM, whether erasable or rewritable or not, or in the form of memory such as, for example, RAM memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. A method of operating a subscriber station, the method comprising:
   performing a network entry procedure through a base station (BS);
   receiving multicast service authentication information comprising a machine-to-machine (M2M) service group security seed from the BS during the network entry procedure;
   generating a multicast data encryption key based on the multicast service authentication information; and communicating data with the BS based on the multicast data encryption key,
  wherein the multicast data encryption key is determined by Equation below:

$$MGTEK = Dot16KDF(MAK, MGSS|Key\_counter|MGID|\text{``MGTEK''}, 128)$$

where,
MGTEK: multicast data encryption key,
MAK: M2M service authorization key,
MGSS: M2M service group security seed,
Key_counter: index of the currently used MGTEK,
MGID: multicast group identifier,
"MGTEK": character string representing that it is multicast data encryption key, and
Dot16KDF: algorithm of generating multicast data encryption key of 128 bits that inputs M2M service authorization key, M2M service group security seed, and multicast group identifier.

2. The method of claim 1, wherein the multicast service authentication information further comprises at least one of a multicast group IDentifier (ID), and an M2M service authorization key.

3. The method of claim 1, wherein performing the network entry procedure through the BS comprises:
  acquiring synchronization;
  performing a ranging procedure;
  performing a basic capability negotiation procedure;
  performing an authentication procedure; and
  performing a register procedure.

4. The method of claim 3, further comprising, after performing the register procedure, performing a service flow creation procedure.

5. The method of claim 1, wherein receiving the multicast service authentication information from the BS comprises:
  transmitting a register request message to the BS; and
  receiving a register response message comprising the multicast service authentication information BS forwarded from a subscriber station register response message received by the BS from a system controller, wherein the BS transmits the system controller a subscriber station register request message informing that the subscriber station enters a network in response to receiving a register request message from the subscriber station.

6. The method of claim 1, wherein receiving the multicast service authentication information from the BS comprises one of:
  a first process of:
    receiving a service flow creation request message comprising the multicast service authentication information from the BS; and
    transmitting a service flow creation response message to the BS, and
  a second process of:
    transmitting a service flow creation request message to the BS; and
    receiving a service flow creation response message comprising the multicast service authentication information from the BS.

7. The method of claim 1, further comprising:
  determining if it is an idle mode interval;
  if it is the idle mode interval, receiving a paging message instructing a location register procedure;
  deter mining whether a new multicast service authentication information is received through a ranging message during the location register procedure; and
  if the new multicast service authentication information is received, re-generating a multicast data encryption key based on the new multicast service authentication information, and storing the multicast data encryption key.

8. The method of claim 1, further comprising:
  determining if it is an idle mode interval;
  if it is the idle mode interval, receiving a paging message comprising information instructing multicast data encryption key updating;
  receiving new multicast service authentication information according to the information instructing the multicast data encryption key updating; and
  re-generating a multicast data encryption key based on the new multicast service authentication information, and storing the multicast data encryption key.

9. The method of claim 1, further comprising:
  receiving new multicast service authentication information from the BS, through a service change request message or a message exchanged in an authentication procedure; and
  re-generating a multicast data encryption key based on the new multicast service authentication information, and storing the multicast data encryption key,
  wherein the service change request message is unicasted or multicasted.

10. A method of operating a base station (BS) in a machine-to-machine (M2M) communication system, the method comprising:
  performing a network entry procedure of a subscriber station;
  obtaining a M2M service group security seed from a network entity, and
  transmitting multicast service authentication information comprising the M2M service group security seed to the subscriber station during the network entry procedure;
  generating a multicast data encryption key based on the multicast service authentication information; and
  communicating data with the subscriber station based on the multicast data encryption key,
  wherein the multicast data encryption key is determined by Equation below:

$$MGTEK = Dot16KDF(MAK, MGSS|Key\_counter|MGID|\text{``MGTEK''}, 128)$$

where,
MGTEK: multicast data encryption key,
MAK: M2M service authorization key,
MGSS: M2M service group security seed,
Key_counter: index of the currently used MGTEK,
MGID: multicast group identifier, "MGTEK": character string representing that it is multicast data encryption key, and
Dot16KDF: algorithm of generating multicast data encryption key of 128 bits that inputs M2M service authorization key, M2M service group security seed, and multicast group identifier.

11. The method of claim 10, wherein the multicast service authentication information further comprises at least one of a multicast group identifier (ID), and an M2M service authorization key.

12. The method of claim 10, wherein performing the network entry procedure of the subscriber station comprises:
  acquiring synchronization;
  performing a ranging procedure;
  performing a basic capability negotiation procedure;
  performing an authentication procedure; and
  performing a register procedure.

13. The method of claim 12, further comprising, after performing the register procedure, performing a service flow creation procedure.

14. The method of claim 10, wherein, at network entry procedure execution, receiving the multicast service authentication information from a system controller, and forwarding the multicast service authentication information to the subscriber station comprises:
   if receiving a register request message from the subscriber station, transmitting to the system controller a subscriber station register request message of informing that the subscriber station enters a network;
   receiving a subscriber station register response message comprising the multicast service authentication information from the system controller; and
   forwarding the multicast service authentication information received from the system controller, to the subscriber station through a register response message.

15. The method of claim 10, wherein, at network entry procedure execution, receiving the multicast service authentication information from a system controller, and forwarding the multicast service authentication information to the subscriber station comprises:
   receiving a subscriber station service flow creation request message comprising the multicast service authentication information from the system controller;
      forwarding the multicast service authentication information received from the system controller, to the subscriber station through a service flow creation request message; and
   receiving a service flow creation response message from the subscriber station.

16. The method of claim 10, wherein, at network entry procedure execution, receiving the multicast service authentication information from a system controller, and forwarding the multicast service authentication information to the subscriber station comprises: if receiving a service flow creation request message from the subscriber station, transmitting a subscriber station service flow creation request message to the system controller; receiving a subscriber station service flow creation response message comprising the multicast service authentication information from the system controller, and forwarding the multicast service authentication information to the subscriber station through a service flow creation response message; and after receiving a service flow creation check message from the subscriber station, transmitting a subscriber station service flow creation check message to the system controller.

17. The method of claim 10, further comprising:
   receiving new multicast service authentication information from a system controller;
   forwarding the new multicast service authentication information to the subscriber station through a service change request message or a message exchanged in an authentication procedure; and
   re-generating a multicast data encryption key based on the new multicast service authentication information, and storing the multicast data encryption key,
   wherein the service change request message is unicasted or multicasted.

18. The method of claim 10, further comprising:
   determining if it is an idle mode interval;
   if it is the idle mode interval, transmitting a paging message of instructing a location register procedure to the subscriber station;
   transmitting new multicast service authentication information to the subscriber station through a ranging message during the location register procedure; and
   re-generating a multicast data encryption key based on the new multicast service authentication information, and storing the multicast data encryption key.

19. The method of claim 10, further comprising:
   determining if it is an idle mode interval;
   if it is the idle mode interval, transmitting a paging message comprising information instructing multicast data encryption key updating;
   transmitting new multicast service authentication information according to the information instructing the multicast data encryption key updating; and
   re-generating a multicast data encryption key based on the new multicast service authentication information, and storing the multicast data encryption key.

20. A method of a base station (BS) in a machine-to-machine (M2M) communication system, the method comprising:
   determining whether a replay attack preventive counter has expired;
   if the replay attack preventive counter expires, determining if a key counter for generating a multicast data encryption key has expired;
   if the key counter expires, transmitting a request for multicast service authentication information to a group service controller; and
   generating the multicast data encryption key based on the multicast service authentication information, and forwarding the multicast service authentication information to a subscriber station.

21. The method of claim 20, wherein the multicast data encryption key is determined by Equation below:

$$MGTEK=\text{Dot16KDF}(MAK, MGSS|Key\_counter|MGID|\text{``MGTEK''},128)$$

where,
MGTEK: multicast data encryption key,
MAK: M2M service authorization key,
MGSS: M2M service group security seed,
Key_counter: key counter value,
MGID: multicast group identifier,
"MGTEK": character string representing that it is multicast data encryption key, and
Dot16KDF: algorithm of generating multicast data encryption key of 128 bits that inputs MAK, MGSS, Key_counter, and MGID.

22. A method of a subscriber station, the method comprising:
   determining whether a replay attack preventive counter has expired;
   if the replay attack preventive counter expires, determining if a key counter for generating a multicast data encryption key has expired;
   if the key counter expires, receiving multicast service authentication information from a base station (BS); and
   generating the multicast data encryption key based on the multicast service authentication information, and storing the multicast data encryption key.

23. The method of claim 22, wherein the multicast data encryption key is determined by Equation below:

$$MGTEK=\text{Dot16KDF}(MAK, MGSS|Key\_counter|MGID|\text{``MGTEK''},128)$$

where,
MGTEK: multicast data encryption key,

MAK: M2M service authorization key,
MGSS: M2M service group security seed,
Key_counter: key counter value,
MGID: multicast group identifier,
"MGTEK": character string representing that it is multicast data encryption key, and
Dot16KDF: algorithm of generating multicast data encryption key of 128 bits that inputs MAK, MGSS, Key_counter, and MGID.

24. A subscriber station comprising: a transceiver configured to receive a multicast service authentication information comprising a machine-to-machine (M2M) service group security seed from a base station (BS) during a network entry procedure; and a controller configured to generate a multicast data encryption key based on the multicast service authentication information, and communicate data with the BS based on the multicast data encryption key, wherein the multicast data encryption key is determined using Equation below:

$$MGTEK = \text{Dot16KDF}(MAK, MGSS|Key\text{ counter}\ MGID|\text{"MGTEK"}, 128) \text{ where,}$$

MGTEK: multicast data encryption key, MAK: M2M service authorization key, MGSS: M2M service group security seed, MGID: multicast group identifier, Key counter: index of the currently used MGTEK, "MGTEK": character string representing that it is multicast data encryption key, and Dot16KDF: algorithm of generating multicast data encryption key of 128 bits that inputs M2M service authorization key, M2M service group security seed, and multicast group identifier.

25. The subscriber station of claim 24, wherein the multicast service authentication information further comprises at least one of a multicast group identifier (ID), and an M2M service authorization key.

26. The subscriber station of claim 24, wherein the transceiver is configured to:
transmit a register request message to the BS, and
receive a register response message comprising the multicast service authentication information from the BS.

27. The subscriber station of claim 24, wherein the transceiver is configured to:
receive a service flow creation request message comprising the multicast service authentication information from the BS, and transmit a service flow creation response message to the BS, or
transmit a service flow creation request message to the BS, and receive a service flow creation response message comprising the multicast service authentication information from the BS.

28. The subscriber station of claim 24, wherein the controller is configured to:
determine if it is an idle mode interval,
if it is the idle mode interval, receive, via the transceiver, a paging message instructing a location register procedure,
determine whether new multicast service authentication information is received through a ranging message during the location register procedure,
if the new multicast service authentication information is received, re-generate a multicast data encryption key based on the new multicast service authentication information, and
store the multicast data encryption key.

29. The subscriber station of claim 24, wherein the controller is configured to:
determine if it is an idle mode interval,
if it is the idle mode interval, receive, via the transceiver, a paging message comprising information instructing multicast data encryption key updating,
receive, via the transceiver, new multicast service authentication information according to the information instructing the multicast data encryption key updating,
re-generate a multicast data encryption key based on the new multicast service authentication information, and
store the multicast data encryption key.

30. The subscriber station of claim 24, wherein the controller is configured to:
receive, via the transceiver, new multicast service authentication information from the BS, through a service change request message or a message exchanged in an authentication procedure,
re-generate a multicast data encryption key based on the new multicast service authentication information, and
store the multicast data encryption key,
wherein the service change request message is unicasted or multicasted.

31. The subscriber station of claim 24, wherein the controller is configured to: transmit a register request message to the BS; and receive a register response message comprising the multicast service authentication information BS forwarded from a subscriber station register response message received by the BS from a system controller, wherein the BS transmits the system controller a subscriber station register request message informing that the subscriber station enters a network in response to receiving a register request message from the subscriber station.

32. A base station (BS) in a machine-to-machine (M2M) communication system, the base station comprising:
a transceiver; and
a controller configured to:
perform a network entry procedure of a subscriber station;
obtain a M2M service group security seed from a network entity;
control to transmit multicast service authentication information comprising the M2M service group security seed to a subscriber station during the network entry procedure,
generate a multicast data encryption key based on the multicast service authentication information, and
communicate, via the transceiver, data with the subscriber station based on the multicast data encryption key, wherein the multicast data encryption key is determined using Equation below:

$$MGTEK = \text{Dot16KDF}(MAK, MGSS|Key\_counter|MGID|\text{"MGTEK"}, 128)$$

where,
MGTEK: multicast data encryption key,
MAK: M2M service authorization key,
MGSS: M2M service group security seed,
MGM: multicast group identifier,
Key_counter: index of the currently used MGTEK,
"MGTEK": character string representing that it is multicast data encryption key, and
Dot16KDF: algorithm of generating multicast data encryption key of 128 bits that inputs M2M service authorization key, M2M service group security seed, and multicast group identifier.

33. The base station of claim 32, wherein the multicast service authentication information further comprises at least one of a multicast group identifier (ID), and an M2M service authorization key.

34. The base station of claim 32, wherein the transceiver is configured to:
- if receiving a register request message from the subscriber station, transmit a system controller a subscriber station register request message of informing that the subscriber station enters a network;
- receive a subscriber station register response message comprising the multicast service authentication information from the system controller; and
- forward the multicast service authentication information received from the system controller, to the subscriber station through a register response message.

35. The base station of claim 32, wherein the transceiver configured to:
- receive subscriber station service flow creation request message comprising the multicast service authentication information from a system controller;
- forward the multicast service authentication information received from the system controller, to the subscriber station through a service flow creation request message; and
- receive a service flow creation response message from the subscriber station.

36. The base station of claim 32, wherein the transceiver is configured to:
- if receiving a service flow creation request message from the subscriber station, transmit a subscriber station service flow creation request message to a system controller;
- receive a subscriber station service flow creation response message comprising the multicast service authentication information from the system controller, and forwarding the multicast service authentication information to the subscriber station through a service flow creation response message; and
- after receiving a service flow creation check message from the subscriber station, transmit a subscriber station service flow creation check message to the system controller.

37. The base station of claim 32, wherein the controller configured to:
- receive, via the transceiver, new multicast service authentication information from a system controller;
- forward, via the transceiver, the new multicast service authentication information to the subscriber station through a service change request message or a message exchanged in an authentication procedure; and
- re-generate a multicast data encryption key based on the new multicast service authentication information, and storing the multicast data encryption key,
- wherein the service change request message is unicasted or multicasted.

38. The base station of claim 32, wherein the controller configured to:
- determine if it is an idle mode interval;
- if it is the idle mode interval, transmit, via the transceiver, a paging message of instructing a location register procedure to the subscriber station;
- transmit, via the transceiver, the new multicast service authentication information to the subscriber station through a ranging message during the location register procedure; and
- re-generate a multicast data encryption key based on a new multicast service authentication information, and storing the multicast data encryption key.

39. The base station of claim 32, wherein the controller configured to:
- determine if it is an idle mode interval;
- if it is the idle mode interval, transmit, via the transceiver, a paging message comprising information instructing multicast data encryption key updating;
- transmit, via the transceiver, new multicast service authentication information according to the information instructing the multicast data encryption key updating; and
- re-generate a multicast data encryption key based on the new multicast service authentication information, and storing the multicast data encryption key.

40. A subscriber station, the subscriber station comprising: a transceiver; and
a controller configured to determine whether a replay attack preventive counter has expired; if the replay attack preventive counter expires, determine if a key counter for generating a multicast data encryption key has expired; if the key counter expires, receive, via the transceiver, multicast service authentication information from a network node; and generate the multicast data encryption key based on the multicast service authentication information, and store the multicast data encryption key.

* * * * *